United States Patent
Fischer et al.

(10) Patent No.: US 9,983,319 B2
(45) Date of Patent: May 29, 2018

(54) DETECTION LAYER COMPRISING PEROVSKITE CRYSTALS

(71) Applicant: SIEMENS HEALTHCARE GMBH, Erlangen (DE)

(72) Inventors: Rene Fischer, Erlangen (DE); Andreas Kanitz, Hoechstadt (DE); Oliver Schmidt, Erlangen (DE); Sandro Francesco Tedde, Weisendorf (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days. days.

(21) Appl. No.: 15/524,500

(22) PCT Filed: Nov. 26, 2015

(86) PCT No.: PCT/EP2015/077734
§ 371 (c)(1),
(2) Date: May 4, 2017

(87) PCT Pub. No.: WO2016/091600
PCT Pub. Date: Jun. 16, 2016

(65) Prior Publication Data
US 2017/0322323 A1  Nov. 9, 2017

(30) Foreign Application Priority Data

Dec. 11, 2014 (DE) .................. 10 2014 225 541

(51) Int. Cl.
*G01T 1/202* (2006.01)
*G01T 1/20* (2006.01)
*G21K 4/00* (2006.01)

(52) U.S. Cl.
CPC .......... *G01T 1/2023* (2013.01); *G01T 1/2006* (2013.01); *G21K 2004/04* (2013.01); *G21K 2004/10* (2013.01); *G21K 2004/12* (2013.01)

(58) Field of Classification Search
CPC .......................... G01T 1/2023; G01T 1/2006
See application file for complete search history.

(56) References Cited

U.S. PATENT DOCUMENTS

| 6,483,099 B1 | 11/2002 | Yu et al. ............. 250/214.1 |
| 8,637,831 B2 | 1/2014 | Hayden et al. ......... 250/370.11 |

(Continued)

FOREIGN PATENT DOCUMENTS

| DE | 10137012 A1 | 2/2003 | ............... G21K 1/10 |
| DE | 102008063309 A1 | 7/2010 | ............... G01T 1/29 |

(Continued)

OTHER PUBLICATIONS

Kengo, S. et al., "Development of a Novel Ultra-Fast Scintillator with MQW Structure," Proceedings of IEEE Sensors 2002, Orlando, IEEE International Conference on Sensors, pp. 552-555.

(Continued)

*Primary Examiner* — David Porta
*Assistant Examiner* — Mindy Vu
(74) *Attorney, Agent, or Firm* — Slayden Grubert Beard PLLC

(57) ABSTRACT

The present disclosure relates to a detection layer on a substrate. For example, a detection layer may include perovskite crystals of the type $ABX_3$ and/or $AB_2X_4$. A may include at least one monovalent, divalent or trivalent element from the fourth or a higher period in the periodic table and/or mixtures thereof. B may include a monovalent cation, the volumetric parameter of which is sufficient, with the respective element A, for perovskite lattice formation. X may be selected from the group consisting of anions of halides and pseudohalides. The layer may have a thickness of at least 10 μm.

5 Claims, 9 Drawing Sheets

(56) References Cited

U.S. PATENT DOCUMENTS

| | | | |
|---|---|---|---|
| 8,815,119 B2 | 8/2014 | Zhuravleva et al. | 252/301.4 H |
| 2005/0285041 A1 | 12/2005 | Srivastava et al. | 250/361 R |
| 2011/0095266 A1 | 4/2011 | Hayden et al. | 257/21 |
| 2012/0145962 A1* | 6/2012 | Fukuta | C09K 11/7774 252/301.4 R |
| 2015/0136232 A1 | 5/2015 | Snaith et al. | 136/263 |
| 2016/0017223 A1* | 1/2016 | Tanaka | C09K 11/7792 250/370.09 |
| 2016/0313452 A1 | 10/2016 | Hartmann et al. | 250/361 R |

FOREIGN PATENT DOCUMENTS

| | | | | |
|---|---|---|---|---|
| DE | 102008029782 A1 | 3/2012 | | H01L 51/42 |
| DE | 102010043749 A1 | 5/2012 | | G01T 1/20 |
| DE | 102012101199 A1 | 9/2012 | | C04B 35/515 |
| DE | 102014212424 A1 | 6/2015 | | C09K 11/02 |
| WO | 2015/091196 A1 | 6/2015 | | G01T 1/16 |
| WO | 2016/091600 A1 | 6/2016 | | C09K 11/77 |

OTHER PUBLICATIONS

Im, Jeong-Hyeok et al. "Synthesis, Structure, and Photovoltaic Property of a Nanocrystalline 2H Perovskite-Type Novel Sensitizer $(CH_3CH_2NH_3)PbI_3$," Nanoscale Research Letters, URL: http://www.nanoscalereslett.com/content/7/1/353, 7 pages, 2012.

Noel, Nakita K. et al., "Lead-Free Organic-Inorganic Tin Halide Perovskites for Photovoltaic Applications," Energy and Environmental Science Accepted Manuscript, 25 pages, 2012.

Dirin, Dmitry N. et al., "Lead Halide Perovskites and Other Metal Halide Complexes as Inorganic Caping Ligands for Colloidal Nanocrystals," Journal of American Chemical Society, 4 pages, 2014.

Tweet "Neues Material für Rontgendetektoren: Solarzellen können helfen, Knochenbrüche zu finden," Friedrich-Alexander-Universitat Erlangen-Nurnberg, Solarserver.de, Heindl Server GmbH, 3 pages (German language w/ English translation), 2015.

German Office Action, Application No. 102014225541.4, 10 pages, dated Jul. 13, 2015.

International Search Report and Written Opinion, Application No. PCT/EP2015/077734, 14 pages, dated Mar. 15, 2016.

McLeod, John A. et al., "Self-Alignment of the Methylammonium Cations in Thin-Film Organometal Perovskites," The Journal of Physical Chemistry Letters, vol. 5, No. 16, pp. 2863-2867, Aug. 4, 2014.

Japanese Office Action, Application No. 2017524047, 2 pages, dated Sep. 25, 2017.

Van Eijk, Carel W.E. et al., "Scintillation properties of a crystal of $(C6H5(CH2)2NH3)2PbBr4$," IEEE Nuclear Science Symposium Conference Record, pp. 3525-3528, 2008.

Japanese Grant Decision, Application No. 2017524047, 2 pages, Dec. 19, 2017.

* cited by examiner

I  II

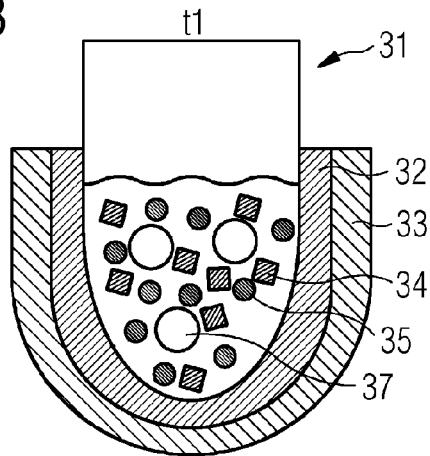
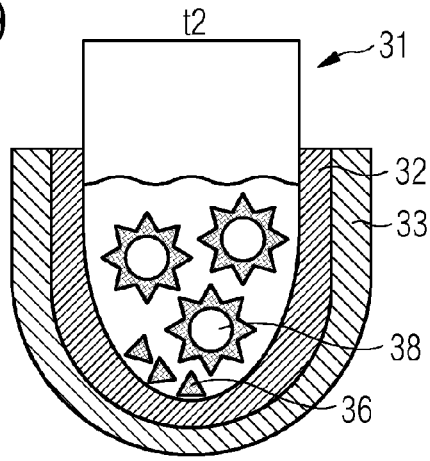
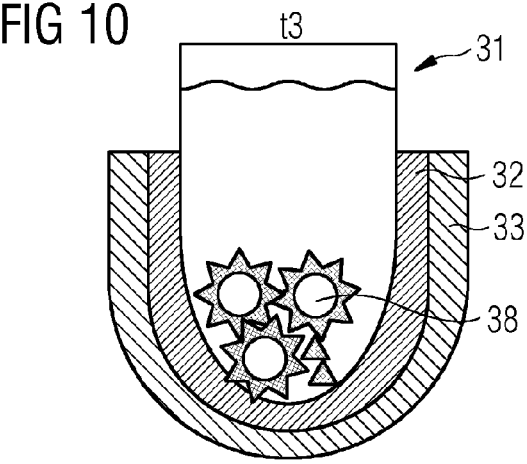

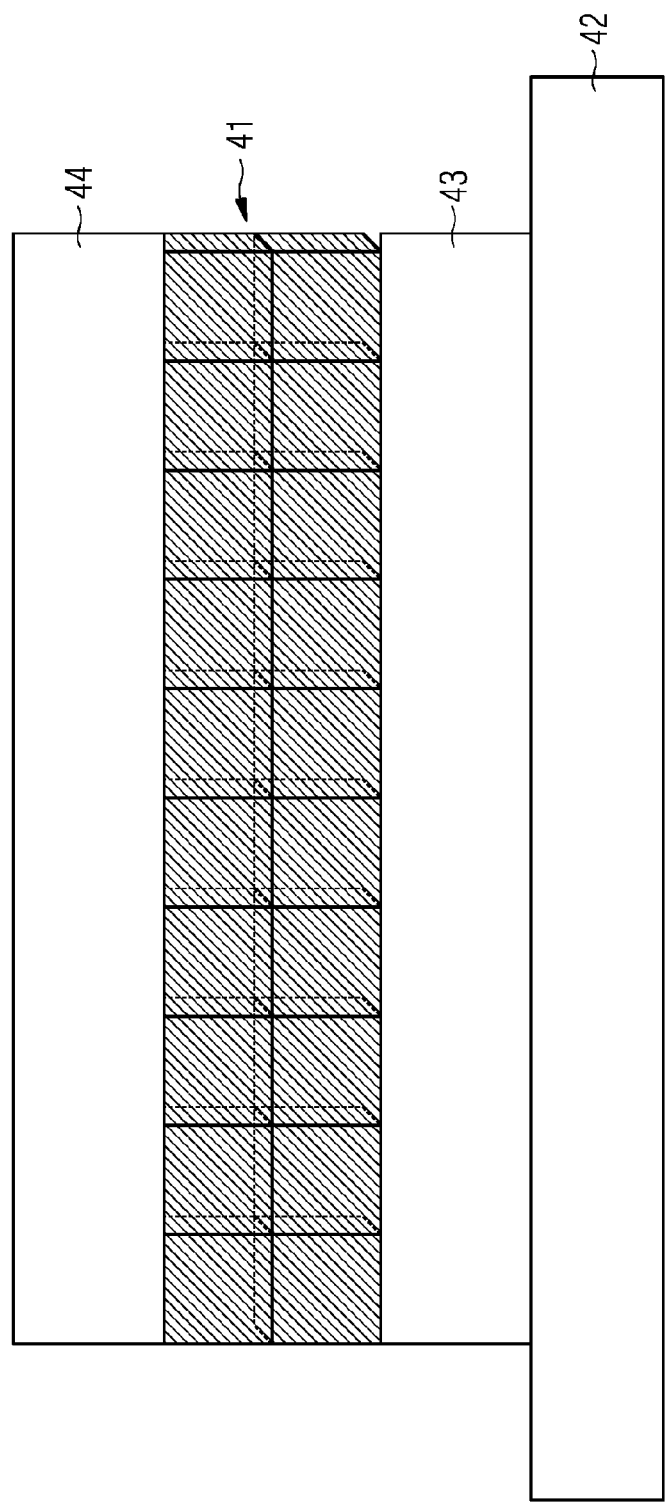

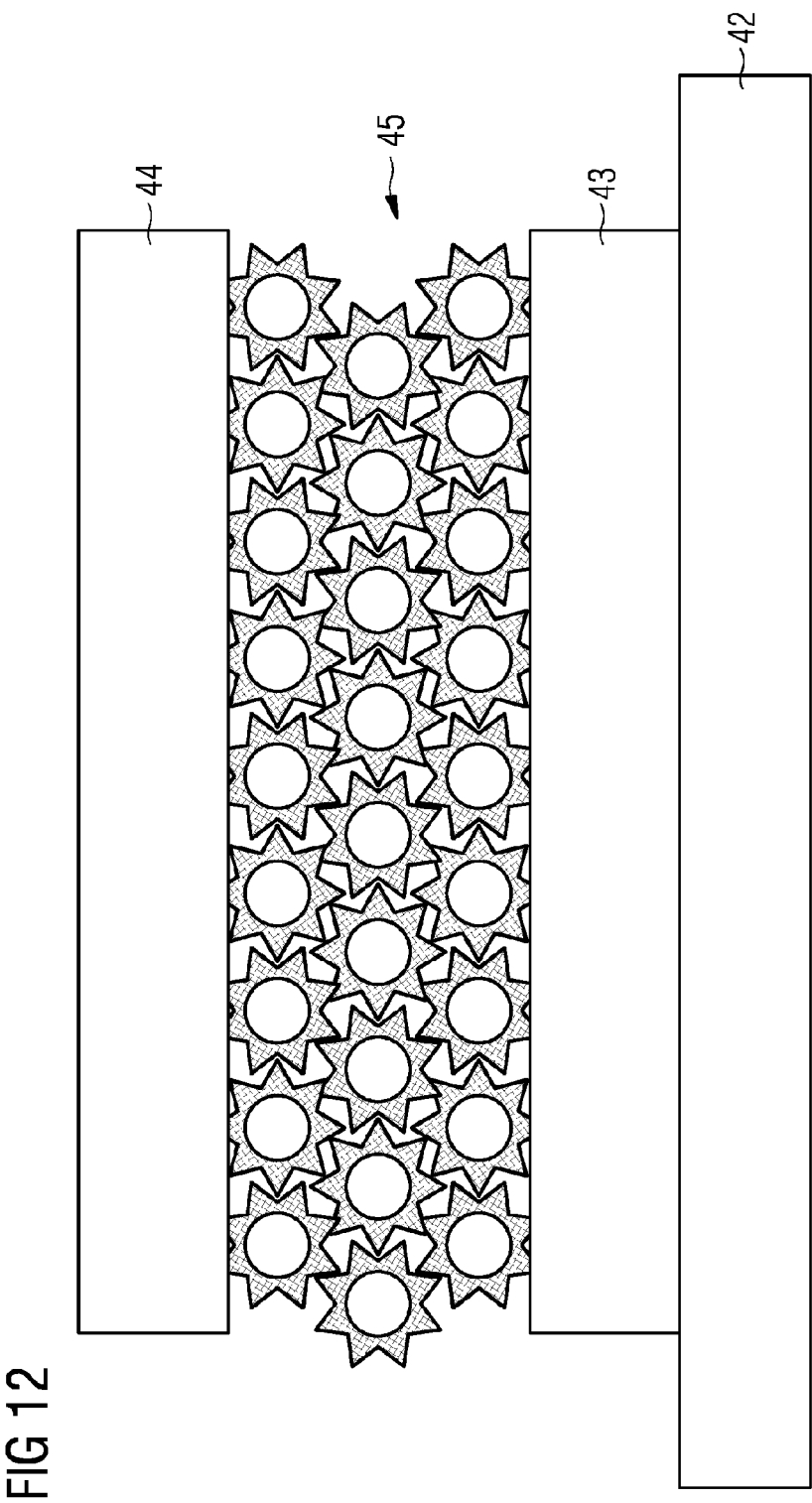

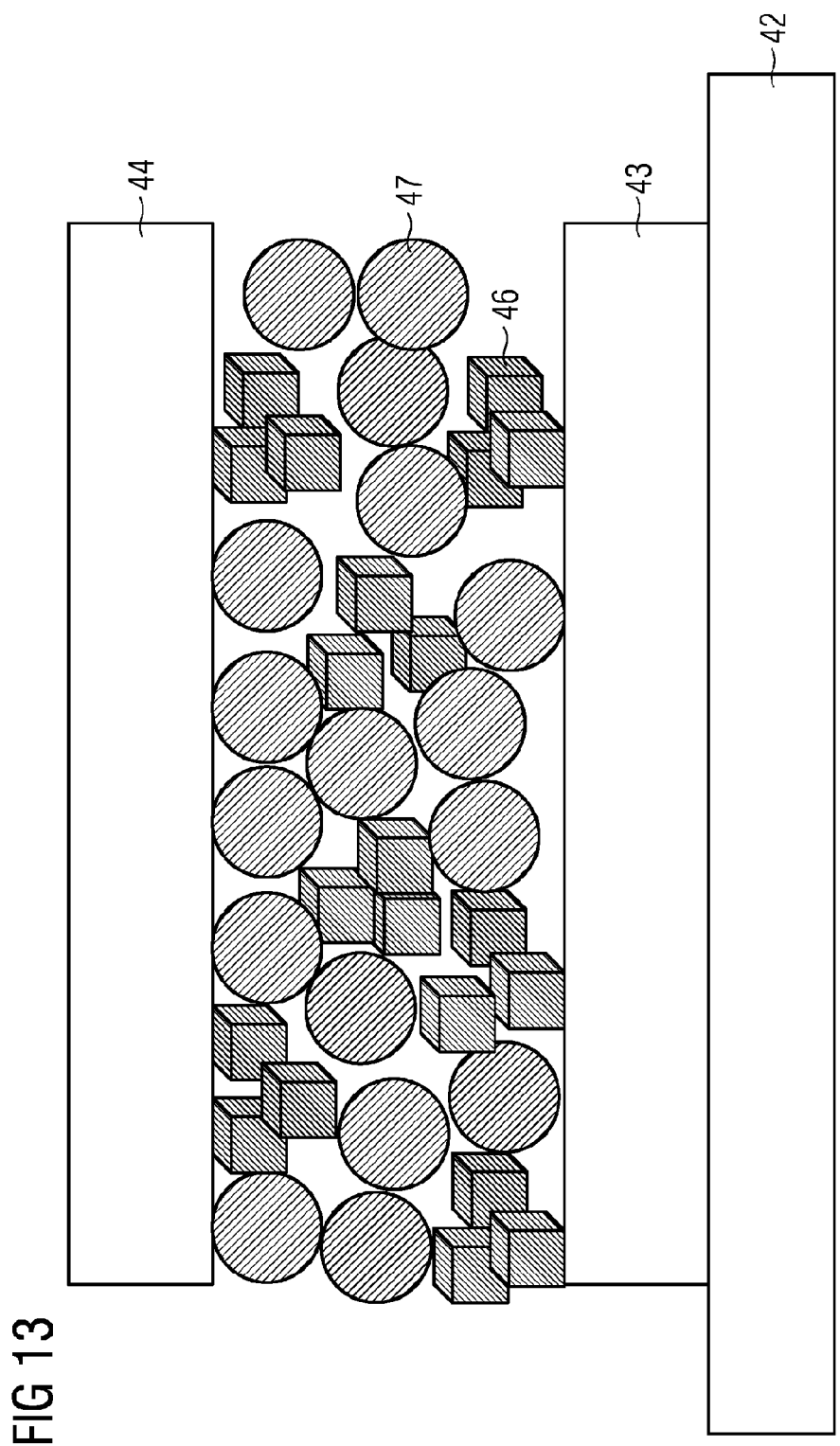

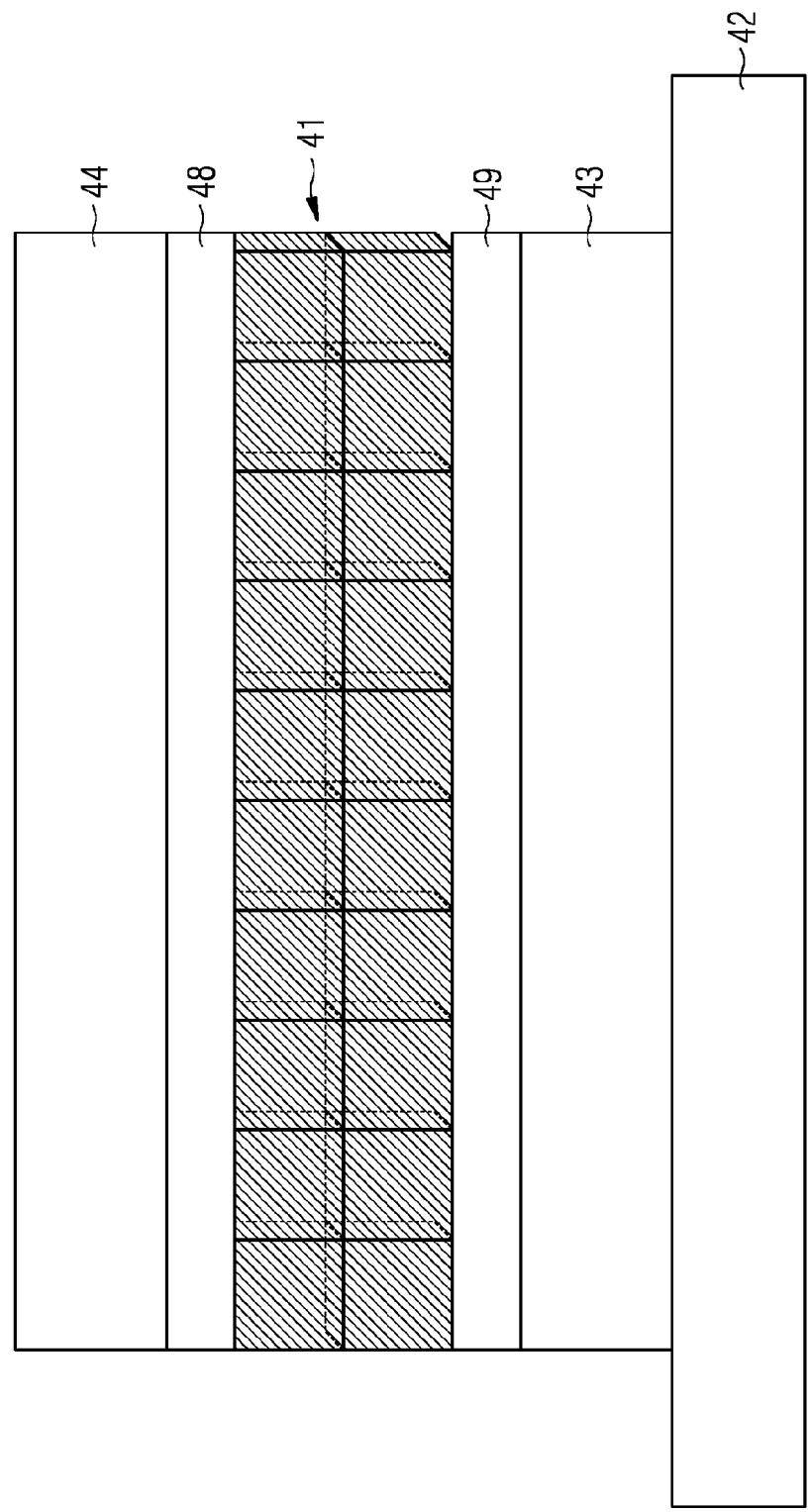

DETECTION LAYER COMPRISING PEROVSKITE CRYSTALS

CROSS-REFERENCE TO RELATED APPLICATIONS

This application is a U.S. National Stage Application of International Application No. PCT/EP2015/077734 filed Nov. 26, 2015, which designates the United States of America, and claims priority to DE Application No. 10 2014 225 541.4 filed Dec. 11, 2014, the contents of which are hereby incorporated by reference in their entirety.

TECHNICAL FIELD

The present disclosure relates to a detection layer on a substrate. The teachings thereof may be embodied in detection layers and/or detectors comprising perovskite crystals.

BACKGROUND

Digital X-ray detectors, are used, inter alia, in medical diagnostics. The size of these detectors is typically between 20×20 cm$^2$ and 43×43 cm$^2$. The current state of the art is represented by detectors based upon amorphous silicon (using indirect conversion) and amorphous selenium (with direct conversion). The principles for direct conversion (I) and indirect conversion (II) are set out in FIG. 1. In direct conversion I, an X-ray quantum 1 excites a particle 2 and electron/hole pairs 2a, 2b are formed which then migrate to the electrodes 4 (anode and cathode, for example, pixel electrodes) and are detected there. In indirect conversion II, the X-ray quantum 1 excites the particle 2 which, in turn, emits radiation 2' with a lower energy (e.g. visible light, UV, or IR radiation) which is then detected by means of a photodetector 3 (e.g. photodiode).

Indirect X-ray conversion comprises the combination of a scintillator layer (e.g. $Gd_2O_2S$ or CsI with different dopants such as terbium, thallium, europium, etc.; layer thicknesses are typically 0.1-1 mm) and a photodetector (e.g. a photodiode). The emission wavelength of the scintillator light from X-ray conversion coincides with the spectral sensitivity of the photodetector.

In the case of direct X-ray conversion, again the X-ray radiation is directly converted into electron/hole pairs and these are electronically read out (e.g. amorphous Se). Direct X-ray conversion in selenium is typically undertaken with up to 1 mm thick layers which are reverse biased in the kV range. Whereas indirectly converting detectors have become established in particular due to being easy and inexpensive to manufacture, direct converters have a significantly better resolving power.

An alternative to the aforementioned X-ray detectors on the basis of inorganic semiconductors is hybrid organic detectors which have conventionally been manufactured through application from the liquid phase. This enables, in particular, easy processing on large areas of up to 43×43 cm$^2$ or more. The manufacturing of detectors conventionally comprises the introduction of the inorganic absorber materials, for example, quantum dots or typical scintillator materials, into an organic matrix. Organic semiconductors can easily be applied from the liquid phase onto large surfaces and through the direct mixing-in of the inorganic scintillator granules, the optical cross-talk can be significantly minimized.

Organic semiconductors, in contrast to inorganic semiconductors, have a lower conductivity. This restricted conductivity is problematic if, as for example in X-ray absorption, very thick layers are needed to achieve a sufficient level of sensitivity. Firstly, the efficiency of the photodiode is thereby reduced, since the charge carrier extraction is impeded, secondly the speed of the photodiode is lowered, which limits a use for medical devices, for example, to the field of mammography where only soft X-ray radiation with a low penetration depth is used.

Organic semiconductors are mainly applied from the liquid phase or vapor deposited in a vacuum. All the methods known to date for mixing in inorganic absorber materials use processing from the liquid phase.

U.S. Pat. No. 6,483,099 B1 describes the possibility of an X-ray detection with a scintillator layer on an OPD (organic photodiode). Further embodiments are X-ray detection by mixing ("admixture") of scintillators into an OPD, scintillator as substrate or as part of the electrode. No information is given as to how a scintillator can be introduced homogeneously into a thick OPD layer or how an e.g. 100 µm-thick hybrid diode can be manufactured.

DE 101 37 012 A1 discloses an embodiment of a light-sensitive polymer absorber layer with embedded scintillator granules. The conductivity of the polymer layer is increased by the absorption of light from the scintillator. The mean spacing of the scintillator granules in the layer corresponds to the mean free path length of the photons from the scintillator in the polymer.

DE 10 2008 029 782 A1 describes an X-ray detector based on quantum dots mixed into the organic semiconductor matrix. In this concept, the quantum dots are dispersed in the organic semiconductor solution. Herein, oleic acid or similar is used, which can influence the electrical properties of the organic semiconductor.

DE 10 2010 043 749 A1 relates to an X-ray detector based on the concept described above, wherein scintillators are either dispersed directly in the organic semiconductor solution or are sprayed on in a co-spraying process simultaneously with the organic semiconductor material.

SUMMARY

The teachings of the present disclosure may be embodied in perovskite crystals of the type $ABX_3$ and/or $AB_2X_4$, where A is at least one monovalent, divalent or trivalent element from the fourth or a higher period in the periodic table, e.g. Sn, Ba, Pb and Bi; B represents a monovalent cation, the volumetric parameter of which is sufficient, with the respective element A, for perovskite lattice formation; and X is selected from among the anions of halides and pseudohalides, e.g. from among the anions chloride, bromide and iodide and mixtures thereof, a method for the production of the detection layer, particles coated with the perovskite crystals, and detectors having the inventive detection layers.

Some embodiments include a detection layer on a substrate, in particular for X-ray radiation, comprising perovskite crystals of the type $ABX_3$ and/or $AB_2X_4$, where A is at least one monovalent, divalent or trivalent element from the fourth or a higher period in the periodic table and/or mixtures thereof, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, more preferably amidinium ions, guanidinium ions, isothiuronium ions, formamidinium ions as well as primary, secondary, tertiary and quaternized organic ammonium ions, in some cases with 1 to 10 carbon atoms; and X is selected from among the anions of halides and pseudohalides, e.g. from among the anions chloride, bromide and iodide as well as mixtures thereof, wherein the layer has a thickness of at least 10 μm, at least 20 μm, or at least 100 μm.

In some embodiments, the layer has a thickness of up to 1500 μm, preferably up to 1000 μm.

In some embodiments, the perovskite crystals have substantially a crystal size of 1-10 μm.

In some embodiments, the layer further comprises scintillators.

In some embodiments, the scintillators in the layer are configured as scintillator particles which are surrounded by a shell of perovskite crystals.

In some embodiments, the scintillator particles have a diameter of from 0.01 to 50 μm, from 0.5 to 20 μm, from 1 to 10 μm and/or the shell of perovskite crystals has a thickness from 15 to 1500 nm, 50 to 1000 nm, 100 to 1000 nm, or 150 to 600 nm.

In some embodiments, the detection layer has a thickness such that at least 50%, at least 70%, at least 90% of an incident radiation in the range from 3.3 eV to 10 MeV is absorbed.

Some embodiments may include a method for producing a detection layer, in particular for X-ray radiation, comprising perovskite crystals of the type $ABX_3$ and/or $AB_2X_4$, where A is at least one monovalent, divalent or trivalent element from the fourth or a higher period in the periodic table and/or mixtures thereof, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, more preferably amidinium ions, guanidinium ions, isothiuronium ions, formamidinium ions as well as primary, secondary, tertiary and quaternized organic ammonium ions, some embodiments with with 1 to 10 carbon atoms; and X is selected from among the anions of halides and pseudohalides, e.g. from among the anions chloride, bromide and iodide as well as mixtures thereof, on a substrate, wherein the detection layer is produced by means of a sintering process, comprising:

a) provision of a powder comprising perovskite crystals of the type $ABX_3$ and/or $AB_2X_4$;
b) application of the powder to the substrate;
c) application of pressure and optionally temperature for compaction of the powder.

In some embodiments, the powder further comprises scintillators.

In some embodiments, the scintillators in the powder are configured as scintillator particles which are surrounded by a shell of perovskite crystals.

In some embodiments, the scintillator particles have a diameter of from 0.01 to 50 μm, 0.5 to 20 μm, or from 1 to 10 μm.

In some embodiments, the shell of perovskite crystals has a thickness from 15 to 1500 nm, 50 to 1000 nm, 100 to 1000 nm, or 150 to 600 nm.

Some embodiments may include a coated scintillator particle, wherein the scintillator particle is covered with a shell of perovskite crystals of the type $ABX_3$ and/or $AB_2X_4$, where A is at least one monovalent, divalent or trivalent element from the fourth or a higher period in the periodic table and/or mixtures thereof, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, more preferably amidinium ions, guanidinium ions, isothiuronium ions, formamidinium ions as well as primary, secondary, tertiary and quaternized organic ammonium ions, some embodiments with 1 to 10 carbon atoms; and X is selected from among the anions of halides and pseudohalides, e.g. from among the anions chloride, bromide and iodide as well as mixtures thereof.

Some embodiments include a detector, in particular for X-ray radiation, comprising at least two electrodes and, introduced between the at least two electrodes, at least one detection layer as described above.

In some embodiments, there is at least one hole-conducting and/or electron-conducting and/or insulating intermediate layer.

BRIEF DESCRIPTION OF THE DRAWINGS

The accompanying drawings are intended to illustrate embodiments of the present teachings and to impart further understanding thereof. In relation to the description, they serve to elucidate concepts and principles of the teachings. Other embodiments and many of the advantages are disclosed with reference to the drawings. The elements of the drawings are not necessarily shown in correct scale to one another. Identical, functionally similar and similarly acting elements, features and components are provided in the drawings with the same reference signs, unless otherwise stated.

FIGS. 8 to 10 show schematically the production of scintillator particles with a monocrystalline or polycrystalline perovskite lattice structure as a shell, according to teachings of the present disclosure.

FIG. 11 shows an exemplary layer structure of an X-ray detector based upon sintered perovskite powder, according to teachings of the present disclosure.

The exemplary layer structure shown in FIG. 12 can also be used in an exemplary embodiment of an X-ray detector, according to teachings of the present disclosure, wherein here inventive sintered scintillator particles with a perovskitic covering are used.

FIG. 13 shows schematically an exemplary layer structure of an X-ray detector, according to teachings of the present disclosure, in which sintered scintillator particles and perovskitic particles are used in the detection layer.

FIG. 14 shows schematically a further exemplary layer structure of an X-ray detector, according to teachings of the present disclosure.

Figure 15:
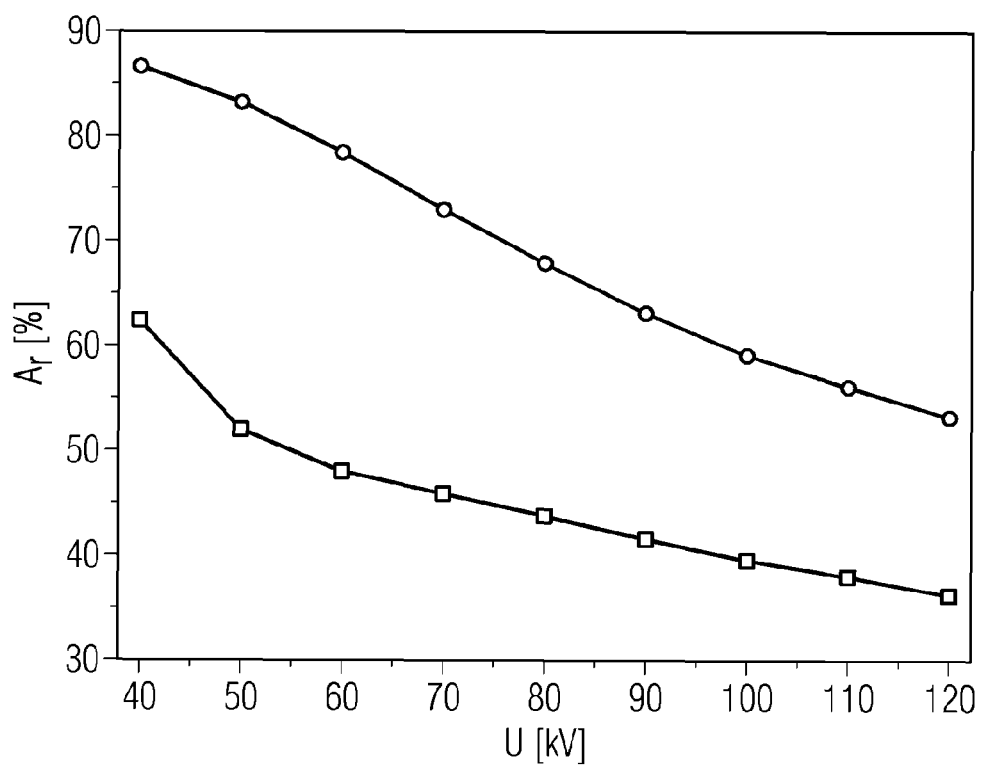

FIG. 15 shows the results of the measurement of the relative absorption of a perovskite layer in comparison with a hybrid organic absorption layer (BHJ+scintillator, volume proportion ~50%).

DETAILED DESCRIPTION

In the first case of fluid phase application of a detection layer, producing a stable dispersion proves to be difficult, in particular, for large scintillator particles. For small particles, typically, dispersants are added to prevent the clumping of the particles, although these negatively affect the electrical properties of the organic semiconductors.

Both methods (liquid phase application and vacuum vapor deposition) have the disadvantage that on application of very thick layers (100 µm or more), enormous quantities of solvent must be released and the layers have high roughness levels. The complete evaporation of the solvent is not only a technical challenge, but also represents a health and environmentally critical problem.

Some materials processed from a solution form perovskite lattice layers. Examples include:
MeNH$_3$I:PbI$_2$
(CH$_3$NH$_3$)Pb(I,Br)$_3$ (Dirin et al. 2014, doi: 10.1021/ja5006288)
CH$_3$NH$_3$SnI$_3$ (Noel et al. 2014, doi: 10.1039/c4ee01076k)
(CH$_3$CH$_2$NH$_3$)PbI$_3$ (Im et al. 2014, doi: 10.1186/1556-276X-7-353)

These materials have a significantly higher charge carrier mobility than organic semiconductors and have a high X-ray absorption cross-section. However, the materials known from the literature are used in methods that were developed for solar cell research (e.g. spinning-on, blade coating, slot coating, spray coating, or vapor deposition) and typically only have a layer thickness of between 100 and 500 nm. Processing to thicker layers rapidly reaches its technological or economic limits with these processes.

Polycrystalline or monocrystalline perovskite absorber layers for use in solar cells are usually applied from the liquid phase (e.g. spinning-on, blade coating, or spraying on) or are vapor deposited in a vacuum process (e.g. PVD). In both, the formation of the crystalline structure takes place during the drying or the deposition process directly on the substrate. In addition, a mixing of inorganic absorber materials (scintillators) into the liquid phase or into a polycrystalline perovskite powder has previously not been described.

Previously known methods for manufacturing absorber powders and for mixing in inorganic absorbers relate to organic materials. For example, DE 102013226339.2 describes a method ("soft sintering") in which an organic photodiode is processed from a dry powder. This method circumvents the above-mentioned disadvantages. As distinct therefrom, the aim of the teachings herein is the provision of an X-ray sensitive material which can be processed with the sinter process.

DE 102014212424.7 describes a method which, in a first step, provides for the production of core-shell powders and, in a second step, the pressing of the powder to a homogeneous film. These powders consist of particles which have a covering of organic semiconductor materials.

The teachings of the present disclosure may be employed to provide a detection layer, in particular for an X-ray detector, having increased efficiency and good conductivity in the detection layer, which leads to improved images, even with reduced irradiation and is thus more protective of the objects or subjects under examination. A material crystallized in a perovskite lattice layer shows, apart from the absorption of visible light and X-ray radiation, also good electrical conductivity of the charge carrier pairs produced and a high level of mobility, for example up to 50 cm$^2$/Vs.

This effect can be used in a detection layer. The detection layer may comprise a material which is based upon a homogeneous, monocrystalline, or polycrystalline powder crystallizing in the perovskite lattice, or upon a homogeneous powder consisting of scintillators, for example, inorganic X-ray absorbers, e.g. quantum dots and/or further known scintillators, and a material which, in the modification as a perovskite lattice structure, adhesively coats the scintillators or X-ray absorbers, or upon a homogeneous powder consisting of a mixture of two types of particles, specifically firstly scintillators, for example, inorganic X-ray absorbers, e.g. quantum dots or typical known scintillators, and secondly, homogeneous monocrystalline or polycrystalline particles crystallizing in a perovskite lattice.

Apart from visible light, the detection layers can also absorb X-ray radiation and can convert it into an electrical signal. In addition, an effective method for producing the detection layers by means of this powder through a solvent-free sintering process ("soft sintering") has been found with which the detection layers can be easily prepared for use in detectors such as, for example, X-ray sensitive diodes.

Some embodiments include a detection layer on a substrate, in particular for X-ray radiation, comprising perovskite crystals of the type ABX$_3$ and/or AB$_2$X$_4$, where A is at least one monovalent, divalent or trivalent element from the fourth or a higher period in the periodic table, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, more preferably amidinium ions, guanidinium ions, isothiuronium ions, formamidinium ions as well as primary, secondary, tertiary and quaternized organic ammonium ions, particularly preferably with 1 to 10 carbon atoms; and X is selected from among the anions of halides and pseudohalides, e.g. the anions chloride, bromide and iodide as well as mixtures thereof, wherein the layer has a thickness of at least 10 µm, at least 20 µm, or at least 100 µm.

Some embodiments include a method for producing a detection layer, in particular for X-ray radiation, comprising perovskite crystals of the type ABX$_3$ and/or AB$_2$X$_4$, where A is at least one monovalent, divalent or trivalent element from the fourth or a higher period in the periodic table, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, more preferably amidinium ions, guanidinium ions, isothiuronium ions, formamidinium ions as well as primary, secondary, tertiary and quaternized organic ammonium ions, some embodiments with 1 to 10 carbon atoms; and X is selected from among the anions of halides and pseudohalides, e.g. the anions chloride, bromide and iodide as well as mixtures thereof, wherein the detection layer is produced by means of a sintering process, comprising:
a) provision of a powder comprising perovskite crystals of the type ABX$_3$ and/or AB$_2$X$_4$;
b) application of the powder to the substrate;
c) application of pressure and optionally temperature for compaction of the powder.

Some embodiments include a coated scintillator particle wherein the scintillator particle is covered with a shell of perovskite crystals.

Some embodiments include a detector, in particular for X-ray radiation, comprising at least two electrodes and at least one detection layer according to the present disclosure introduced between the at least two electrodes.

Some embodiments include a detection layer on a substrate, in particular for X-ray radiation, comprising perovskite crystals of the type $ABX_3$ and/or $AB_2X_4$, where A is at least one monovalent, divalent or trivalent element from the fourth or a higher period in the periodic table, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, for example, amidinium ions, guanidinium ions, isothiuronium ions, formamidinium ions as well as primary, secondary, tertiary and quaternized organic ammonium ions, in some cases with 1 to 10 carbon atoms; and X is selected from among the anions of halides and pseudohalides, e.g. the anions chloride, bromide and iodide as well as mixtures thereof, wherein the layer has a thickness of at least 10 μm, at least 20 μm, or at least 100 μm.

The detection layer is not particularly restricted in its use according to the invention and can detect, for example, X-ray radiation, gamma radiation, or UV radiation. According to particular embodiments, the detection layer serves for the detection of X-ray radiation and is thus an X-ray detection layer.

The area of the detection layer is adapted according to the invention to the use and, for human medical uses is, for example, between 2×2 cm² (e.g. for dental imaging), 20×20 cm² (e.g. for mammography) up to 43×43 cm² (e.g. for lung imaging). For uses in industrial measuring technology or veterinary medicine, the area of the detectors can also be smaller or larger.

The substrate is not particularly restricted and can comprise all substrates which are normally used, for example, in X-ray detectors, gamma detectors or UV detectors. Thus, it can comprise, for example, glass coated with indium tin oxide (ITO), aluminum zinc oxide, doped zinc oxide, silicon, etc. Substrates such as metal films or polymer films also come into consideration.

The perovskite crystals of the type $ABX_3$ and/or $AB_2X_4$ are not particularly restricted, provided A is at least one monovalent, divalent and/or trivalent, positively charged element from the fourth or a higher period in the periodic table and/or mixtures thereof, thus also the fifth, sixth and seventh period including the lanthanides and actinides, wherein the fourth period of the periodic table begins with K and comprises the transition metals starting with Sc; B represents a monovalent cation, the volumetric parameter of which is sufficient, with the respective element A, for perovskite lattice formation; and X is selected from among the anions of halides and pseudohalides, e.g. the anions chloride, bromide and iodide and mixtures thereof.

In some embodiments, A comprises a divalent and/or trivalent element from the fourth or a higher period of the periodic table. According to particular embodiments, in the formulae above, A comprises Sn, Ba, Pb, Bi, or mixtures thereof. The perovskite crystals can thus comprise mixtures of different elements from the fourth or a higher period, thus for example, two different divalent elements or also a mixture of monovalent and divalent elements. According to particular embodiments, the perovskite crystals comprise only one element from the fourth or a higher period of the periodic table. Some embodiments include Sn, Ba, and Pb, as well as mixtures thereof, in particular, divalent cations of these elements.

In some embodiments, B represents a monovalent cation, the volumetric parameter of which is sufficient, with the respective element A, for perovskite lattice formation. Herein, the corresponding volumetric parameters for the perovskite lattice formation are sufficiently well known, both theoretically and also, for example, from X-ray crystallographic investigations, as are the volumetric parameters of monovalent cations and the cations defined under A. Thus, the corresponding monovalent cation B can suitably be determined after determination of the elements A and possibly C, for example, on the basis of computer models and possibly simple experiments. In the above formulae, B preferably represents a monovalent amino group-containing, positively charged, carbon compound, wherein a carbon compound is a compound which has at least one carbon atom and thus comprises organic and also inorganic compounds. According to particular embodiments, B is selected from the group consisting of amidinium ions, guanidinium ions, isothiuronium ions, formamidinium ions and primary, secondary, tertiary and/or quaternized organic ammonium ions which may have 1 to 10 carbon atoms, in particular, 1 to 4 carbon atoms, wherein these can be aliphatic, olefinic, cycloaliphatic, and/or aromatic carbon compounds.

In some embodiments, X is selected from among the anions of halides and pseudohalides e.g. the anions chloride, bromide, and iodide, and mixtures thereof. Thus, for example, different halide ions can be contained in the perovskite crystals, although according to particular embodiments, only one halide ion, for example iodide, is included.

Materials of the general formula $ABX_3$ and $AB_2X_4$ can crystallize in the perovskite lattice where A is a divalent element from the fourth or a higher period in the periodic table, B is any monovalent cation, the volumetric parameter of which is sufficient, with the respective element A, for perovskite lattice formation, and X corresponds to the halide ions iodide, bromide or chloride or mixtures thereof. In some embodiments, both perovskite crystals of the general formula $ABX_3$ and also of the general formula $AB_2X_4$ are present, although only crystals according to one of the two formulae can also be present.

In some embodiments, the perovskite crystals are the following materials mixed in molar ratio:

$CH_3$—$NH_3I$:$PbI_2$=Pb $CH_3NH_3$ $I_3$ $CH_3$—$CH_2$—$NH_3I$:$PbI_2$=Pb $CH_3NH_3$ $I_3$

HO—$CH_2$—$CH_2$—$NH_3$:$PbI_2$=Pb  HO—$CH_2$—$CH_2$—$NH_3$ $I_3$

Ph-$CH_2$—$CH_2$—$NH_3I$:$PbI_2$=Pb  (Ph-$CH_2$—$CH_2$—$NH_3)_2$ $I_4$

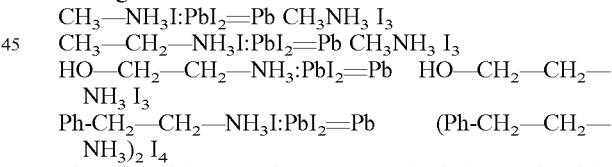

The perovskite crystals are not particularly restricted in their size and shape. The perovskite crystals can be present monocrystalline or polycrystalline. According to particular embodiments, the perovskite crystals are also homogenous. Furthermore, the perovskite crystals can also be present as mixed crystals.

The perovskite crystals can be present in the detection layer in a variety of ways, for example, based on powders of perovskite crystals, powders of scintillator particles provided with a perovskite crystal shell, and mixed powders of perovskite crystal particles and scintillator particles.

Figure 1:
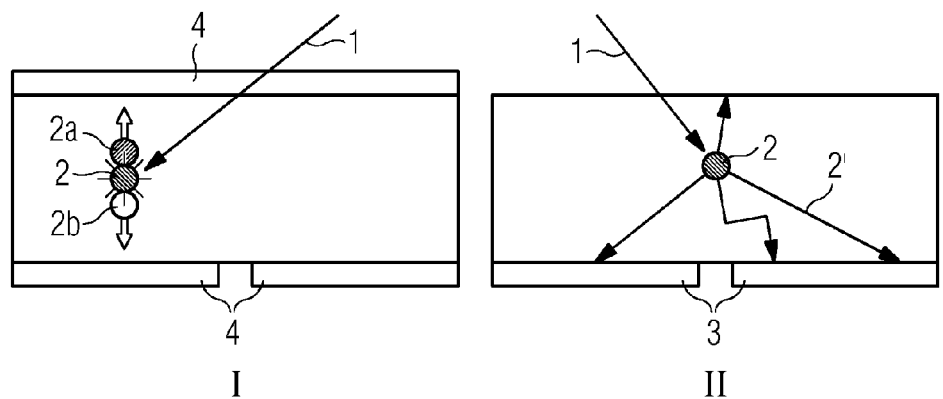
FIG. 1 shows schematically the concepts of direct X-ray conversion and indirect X-ray conversion compared with one another.
Figure 2:
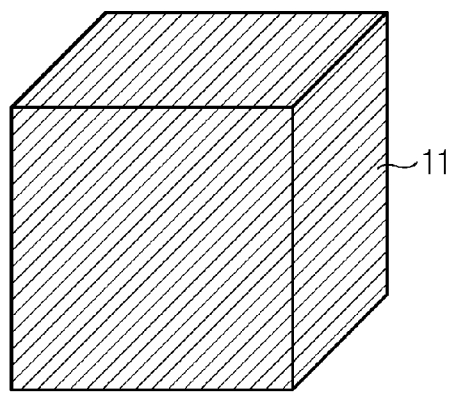
FIG. 2 shows schematically a monocrystalline or polycrystalline particle with a perovskite lattice structure.

The perovskite crystals can be present in the detection layer as perovskite crystal particles, as shown by way of example, schematically in FIG. 2. The perovskite crystal particle 11 shown in FIG. 2 may comprise a monocrystalline or polycrystalline particle with a perovskite lattice structure wherein the structure, as shown in FIG. 2, can be regular and even in all directions, so that a cubic or spherical crystal particle is produced, although other regular or irregular crystal particle forms are also conceivable.

Figure 3:
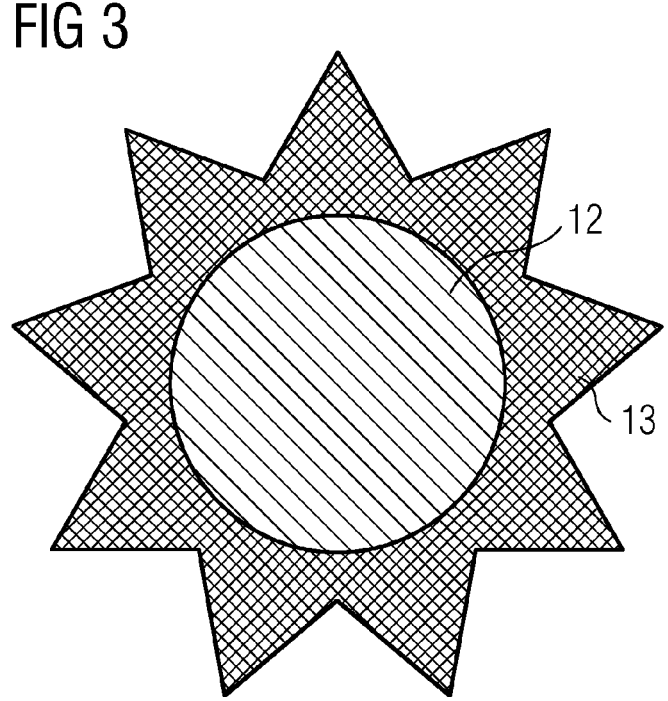
FIG. 3 shows schematically and in an abstract form a coated scintillator particle with a monocrystalline or polycrystalline perovskite lattice structure as a shell, according to teachings of the present disclosure.

Furthermore, the perovskite crystals may be in the detection layer in covered scintillator particles ("core-shell particles"), as shown by way of example, schematically in FIG. 3. According to FIG. 3, a scintillator particle 12 is surrounded by a perovskite crystal shell 13, wherein the perovskite crystal shell 13 can have a monocrystalline or polycrystalline perovskite lattice structure. As shown in FIG. 3, the scintillator particle 12 can be spherical and the perovskite crystal shell 13 can be irregular, although other forms can also be provided for the scintillator particles 12 and the perovskite crystal shell 13. Thus both the scintillator particles 12 and also the perovskite crystal shell 13 can be irregular due to a crystalline basic structure of the two materials, as shown in an exaggerated form in FIG. 3 for the perovskite crystal shell 13, although they can also be almost even and, for example, result in an approximately spherical form, both for the nucleus and also the shell. Some embodiments differ therefrom with only a partial covering.

Figure 4:
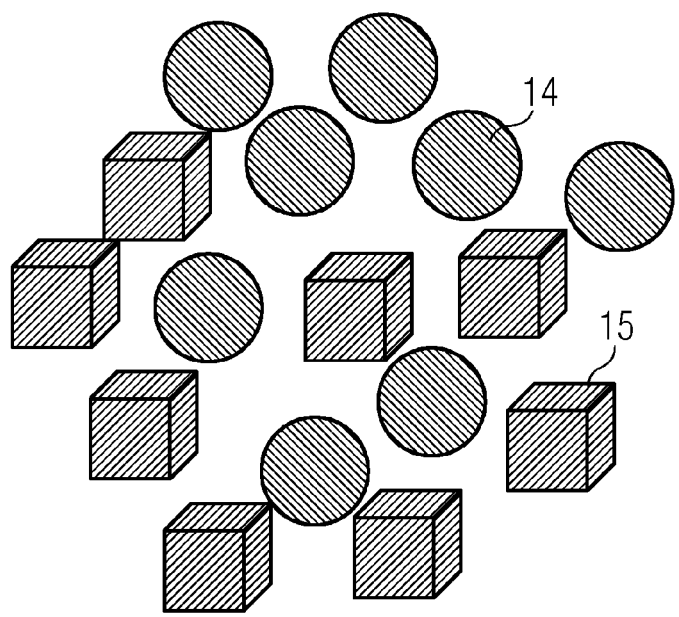
FIG. 4 shows schematically a powder mixture of scintillators and monocrystalline or polycrystalline perovskite particles, according to teachings of the present disclosure.

Furthermore, the detection layer may comprise a mixed layer in which scintillator particles 14 and perovskite crystal particles 15 are included in a mixture, as shown schematically in FIG. 4. The mixing may be homogeneous or heterogeneous and, in some embodiments, further constituents are included in the detection layer. In some embodiments, however, only perovskite crystal particles or scintillator particles with a perovskite crystal shell or mixtures of scintillator particles and perovskite crystal particles are contained in the detection layer, as shown in FIGS. 2 to 4.

All three powders are suitable for use in detectors such as X-ray detectors and enable, firstly, the production of thicker absorber layers (for example 10-1500 μm) from monocrystalline or polycrystalline perovskite powder and, secondly, the conversion into visible light by a scintillator and subsequent absorption of the visible light by the perovskite lattice structure, wherein the perovskite crystals can also simultaneously absorb X-rays. At the same time, the conversion rate of the absorber layer is increased by direct absorption of the X-ray radiation by the material crystallized in the perovskite lattice.

Figure 5:
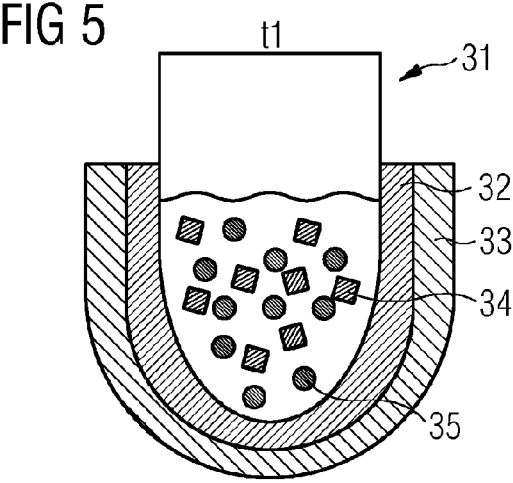
FIGS. 5 to 7 show schematically the production of monocrystalline or polycrystalline particles with a perovskite lattice structure according to, according to teachings of the present disclosure.
Figure 6:
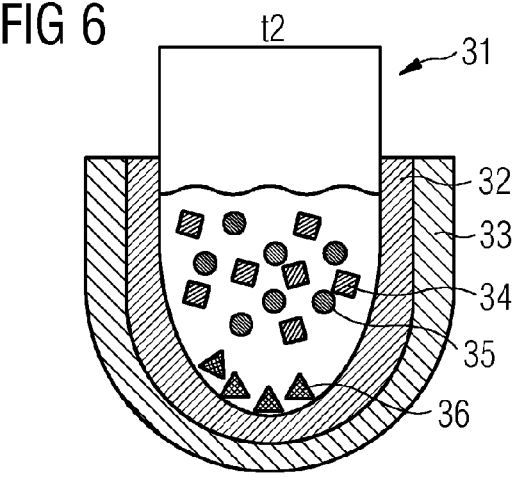
Figure 7:
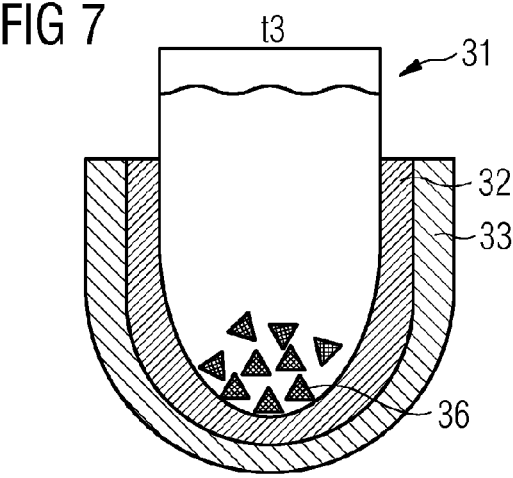

The polycrystalline perovskite crystal powders can be produced from the corresponding starting materials such as, for example, $PbI_2$ and a corresponding organic ammonium iodide by joint successive dissolution with ultrasound through a first solvent, as shown, for example, in FIGS. 5 to 7. At the time point t1 (FIG. 5), placement of the starting materials into the first solvent, for example, a first starting material 34 such as $PbI_2$ and a second starting material 35 such as, for example, a correspondingly selected organic ammonium iodide, e.g. methylammonium iodide $MeNH_3I$, are placed in a vessel 31 with a first solvent, for example a polar solvent, with, for example, 1 to 5 C atoms, such as methanol, if necessary heated with a water bath 32 and treated with an ultrasonic bath 33. At a time point t2 (FIG. 6), the time point of the perovskite crystal formation, above a certain concentration, the perovskite crystals form in the solution, wherein these then fall to the bottom of the vessel 31. The subsequent further crystallization in the perovskite lattice of the remaining starting materials at the time point t3 (FIG. 7), the precipitation, takes place, for example, by addition of a second solvent, for example, a non-polar solvent such as an ether which can also be aromatic or cyclic. An exemplary non-polar solvent is diethyl ether. Through the simultaneous action of ultrasound from the ultrasonic bath 33, a homogeneous microcrystallinity can be ensured.

Through the selection of the second solvent, the yield of the respective reaction product in the perovskite structure can be maximized to >99% once it has been suction extracted under inert conditions and the powder dried. Subsequently, the powder can be used for production of a detection layer or a detector wherein, following the production, the size of the particles in the powder can lie in the range 1-100 μm (e.g. 1-10 μm).

A corresponding method can also be used for producing particles, wherein a scintillator particle is enclosed by a photoactive and electrically active crystalline layer with a perovskite lattice structure, as shown by way of example in FIGS. 8 to 10. According to FIG. 8, at the time point t1, a scintillator particle 37, for example $Gd_2O_2S$:Tb which emits green light under X-ray excitation, is added as a further starting material to the first solvent. During the crystal formation at the time point t2 (FIG. 9), a covered scintillator particle 38 then forms wherein the scintillator particle 37 is coated with a crystalline layer having a perovskite structure, for example, consisting of the perovskite phase of the mixture $MeNH_3I$:$PbI_2$. The absorption of the crystalline shell layer is herein preferably adjusted to the emission spectrum of the scintillators. The crystalline covering herein assumes both the absorption of the light emitted by a scintillator and the direct generation of charge carrier pairs and the transport of the separated charge carriers to the corresponding contacts.

The production of the particles with a scintillator nucleus (see FIGS. 8 to 10) takes place similarly to the process shown in FIGS. 5 to 7. The scintillator particles 37 and the starting materials 34, 35 for forming a perovskite lattice structure are homogeneously dispersed in a first solvent by means of ultrasound. Through the use of the ultrasound for dispersing the scintillator, the use of a ligand shell to prevent clumping can be dispensed with. The scintillator particles 37 simultaneously serve as nuclei of crystallization, on the surface of which the crystalline layer is deposited adhesively in the modification of the perovskite lattice. By the addition of a second solvent at the time point t3 (FIG. 10) and ultrasound treatment, a homogeneous particulate material is obtained in a rapidly precipitating suspension. Following removal of the solvent under inert conditions and drying in an inert gas stream a, for example, grey-black powder in a yield of >99% is obtained, which can be used subsequently for component production.

The proportion by weight of the scintillator particles as compared with the starting materials can herein determine the "gray value" of the powder and can vary, for example, from greater than 0:1 to 30:1, e.g. from greater than 0:1 to 2:1. The thickness of the absorbing, crystalline shell is adapted according to the absorption length of a photon in this layer. For example, the absorption length of green light in this crystalline layer is typically ~250 nm. A thicker covering would therefore not improve the absorption properties.

The powder produced according to the above-described method from monocrystalline or polycrystalline perovskitic crystals (FIG. 2) can also be mixed with the pure scintillator particles, so that a homogeneous mixture of both powders (FIG. 4) which can also be used to produce detectors such as X-ray sensitive components. Mixtures of perovskite crystal particles with scintillator particles covered with perovskite crystals and/or scintillator particles are also possible, wherein the mixing ratios can be adjusted on the basis of the materials used. Herein, for example, the material of the perovskite crystal shell in the coated scintillator particle can also differ from that of a further perovskite crystal particle to cover a broader X-ray absorption spectrum. A similar principle also applies to different scintillator particles. A plurality of perovskite crystal particles and/or scintillator particles can also be provided.

In some embodiments, the layer has a thickness of up to 1500 μm, e.g. up to 1000 μm. With thicker layers, for example, the radiation to be detected can no longer penetrate far enough so that no further efficiency increases can be achieved and losses can possibly also occur.

In some embodiments, the perovskite crystals in the inventive detection layer can have substantially a crystal size of 1-10 μm. The size of the crystal is herein the mean crystal diameter, as can be determined, for example by measuring methods such as scanning electron microscopy. The deviation from the mean crystal diameter in the perovskite crystals in every direction according to particular embodiments can herein be, for example, less than 50% as compared with the mean crystal diameter. Thus, for example, in the production of perovskite powder of the composition $CH_3NH_3PbI_3$, a size distribution of 3-8 μm with a mean crystal diameter of 5 μm results.

Although the detection layer may have only perovskite crystals for the detection of radiation such as X-rays or can consist substantially only of perovskite crystals, according to particular embodiments, it can also comprise scintillators. The scintillators are herein not particular restricted and can also be matched to the use, for example, for the detection of X-ray radiation.

In some embodiments, the perovskite crystals absorb radiation in a wavelength range in which the scintillator particles emit radiation. According to particular embodiments, the perovskite crystals also have at least one absorption maximum at a wavelength which corresponds to an emission wavelength of the scintillator particle, e.g. the emission wavelength of a maximum of the emission of the scintillator particle.

Exemplary material combinations for a combination of scintillator particles with perovskite crystals for different wavelengths are as follows:

Suitable green scintillators are, for example, $Gd_2O_2S:Pr$, Ce (gadolinium oxysulfide, doped with praseodymium and cerium with an emission maximum at approximately 515 nm), $Gd_2O_2S:Tb$ (gadolinium oxysulfide, doped with terbium, having an emission maximum at approximately 545 nm), $Gd_2O_2S:Pr,Ce,F$ (gadolinium oxysulfide, doped with praseodymium or cerium or fluorine, having an emission maximum at approximately 510 nm), YAG:Ce (yttrium aluminum garnet doped with cerium, having an emission maximum at approximately 550 nm), CsI:Tl (cesium iodide, doped with thallium, having an emission maximum at approximately 525 nm), $CdI_2:Eu$ (europium-doped cadmium iodide, having an emission maximum at approximately 580 nm) or $Lu_2O_3:Tb$ (lutetium oxide doped with terbium, having an emission maximum at approximately 545 nm), are distinguished by an emission maximum in the range of 515-580 nm and are therefore well suited to the absorption spectrum of $(CH_3NH_3)PbI_3$ at 450-750 nm. The scintillator $Bi_4Ge_3O_{12}$ or BGO (bismuth germanate with an emission maximum at approximately 480 nm) can be combined well with $(CH_3NH_3)BrI_3$ or $(CH_3NH_3)PbI_3$, which have good absorption in the range of 460-510 nm.

Suitable blue scintillators may include: $Lu_2SiO_5:Ce$ or LSO (cesium-doped lutetium oxyorthosilicate, having an emission maximum at approximately 420 nm), $Lu_{1.8}Y_{0.2}SiO_5:Ce$ (cerium-doped lutetium oxyorthosilicate, having an emission maximum at approximately 420 nm), $CdWO_4$ (cadmium tungstate, having an emission maximum at approximately 475 nm), CsI:Na (cesium iodide doped with sodium, having an emission maximum at approximately 420 nm), or NaI:Tl (thallium-doped sodium iodide, having an emission maximum at approximately 415 nm), $Bi_4Ge_3O_{12}$ or BGO (bismuth germanate, having an emission maximum at approximately 480 nm), $Gd_2SiO_5$ or GSO (gadolinium oxyorthsilicate doped with cerium, having an emission maximum at approximately 440 nm), or CsBr:Eu (cesium bromide doped with europium, having an emission maximum at approximately 445 nm), which can be combined well with the perovskites mentioned.

Red scintillators such as $Lu_2O_3:Eu$ (lutetium oxide doped with europium, having an emission maximum at approximately 610-625 nm), $Lu_2O_3:Tb$ (lutetium oxide doped with terbium, having an emission maximum at approximately 610-625 nm) or $Gd_2O_3:Eu$ (gadolinium oxysulfide doped with europium, having an emission maximum at approximately 610-625 nm), YGdO:(Eu,Pr) (europium and/or praseodymium-doped yttrium gadolinium oxide, having an emission maximum at approximately 610 nm), GdGaO:Cr, Ce (chromium and/or cesium-doped gadolinium gallium oxide), or CuI (copper iodide, having a emission maximum at approximately 720 nm) can be combined well with $(CH_3NH_3)PbI_3$.

Some embodiments include these pairs: $Gd_2O_2S:Tb$ or YAG:Ce in combination with $(CH_3NH_3)PbI_3$ or $(CH_3NH_3)BrI_3$, $Lu_2SiO_5:Ce$ in combination with $CH_3NH_3)PbI_3$ or $(CH_3NH_3)BrI_3$ or YGdO:Eu with $CH_3NH_3)PbI_3$.

In some embodiments, the scintillators are also homogenously distributed in the layer. By this means, more even absorption by the scintillators can be ensured. The scintillators in the layer may include scintillator particles which are surrounded by a shell of perovskite crystals.

In some embodiments, the scintillator particle has a diameter of from 0.01 to 50 μm, e.g. 0.5 to 20 μm, e.g. from 1 to 10 μm. This diameter can suitably be determined according to optical (e.g. dynamic light scattering, DLS), electron microscopy, or electrical analysis methods (e.g. Coulter counter) and thus adjusted. With decreasing diameter of the particles, the emission strength generally declines. In some embodiments, the scintillator particles have a diameter of 0.1-30 μm, e.g. 1-10 μm, which is matched to the interaction length of high-energy electrons released by X-ray quanta. For the detection of UV radiation, the fall is less severe, so that smaller particles of up to 10 nm diameter can also be used.

The covering of perovskite crystals covers the scintillator particle in the scintillator particle coated to at least 80%, e.g. at least 90% or at least 95% of its total outer surface. According to particular embodiments, the scintillator particle is completely covered, that is to 100%, so that the coated scintillator particle is provided with the covering on all sides. In this way, a simpler producibility is achieved and, for example, the completion of the manufacturing can simply be determined by observation following completion of the covering, if the shell has a different color from the scintillator particles.

In some embodiments, the shell or covering of the photoactive material has a thickness from 15 to 1500 nm, e.g. 50 to 1000 nm, 100 to 1000 nm, or 150 to 600 nm. In some embodiments, the thickness of the shell is not more than 2.5 times the penetration depth of the emitted radiation of the scintillator particle, so that two directly adjacent scintillator particles have a spacing from one another of not more than five times the penetration depth of the emitted radiation of the scintillator particles.

The penetration depth can be derived from the Lambert-Beer law:

$$I = I\_0 * \exp(-\text{alpha} * d)$$

I=transmitted intensity
I_0=initiated intensity
alpha=absorption coefficient
d=layer thickness/penetrated depth of the medium The penetration depth delta is defined as the layer thickness at which the intensity of the electromagnetic radiation has fallen to a 1/e-th part of the starting value and thus is the reciprocal value of the wavelength-dependent absorption coefficient.

$$\text{delta} = 1/\text{alpha}$$

The absorption coefficient of perovskite crystals, for example, at typical layer thicknesses in use in solar cells are comparable with those of bulk heterojunction (BHJ) systems consisting of P3HT:PCBM, therefore for example, preferred layer thicknesses for coated scintillators are in the same order of size as in the case of BHJ systems as revealed, for example, in Nature Photonics, volume 8, pages 506-514, 2014, doi:10.1038/nphoton.2014.134.

The quantities to be used for producing coated scintillator particles can be derived, for example, on the basis of the following considerations:

Shell Thickness and the Starting Quantities Needed:

The total volume of an exemplary detection layer is made up of the scintillator nucleus $V_{scintillator}$ and the coating volume of the perovskite crystals $V_{perovskite}$ together. To measure an optimum ratio, the density of the perovskite crystals $\rho_{perovskite}$ and of the scintillator $\rho_{scintillator}$ are needed in order to arrive at the respective weight $W_{perovskite}$ and $W_{scintillator}$.

Total volume ($V_{total}$) of the detection layer:

$$V_{total} = V_{perovskite} + V_{scintillator} = \frac{W_{perovskite}}{\rho_{perovskite}} + \frac{W_{scintillator}}{\rho_{scintillator}}$$

To emphasize the distinctive ratios of the volumes and the quantities, these are given in volume-percent and quantity-percent in comparison with the total volume and quantity. The following two formulae illustrate this.

Volume-percentage proportion of the perovskite ($V_{perovskite}\%$):

$$V_{perovskite\%} = 100 \cdot \frac{V_{perovskite}}{V_{total}}$$

Quantity-percentage proportion of the perovskite ($W_{perovskite}\%$):

$$W_{perovskite\%} = 100 \cdot \frac{W_{perovskite}}{W_{scintillator} + W_{perovskite}}$$

The shell volume depends on the desired absorption of the perovskite. The absorption can be adjusted by means of the layer thickness $r_{perovskite}$ of the shell volume and thus by the absorption length of the emitted light. The shell volume is made up from the total volume with the radii $r_{scintillator}$ and $r_{perovskite}$ minus the inner sphere, the scintillator. It can be calculated as follows.

Shell volume sought ($V_{perovskite}$) and thickness ($r_{perovskite}$)

$$V_{perovskite} = \frac{4\pi}{3}((r_{scintillator} + r_{perovskite})^3 - (r_{scintillator})^3)$$

In some embodiments, the detection layer has a thickness, regardless of whether scintillators are contained therein or not, such that at least 50%, at least 70%, or at least 90% of an incident radiation in the range from 3.3 eV to 10 MeV is absorbed. The absorption of the incident radiation can herein simply be determined for a particular material of the layer by absorption spectrometry with different thicknesses and the corresponding layer thickness can be determined by subsequent calculation based on known formulae or by graphical determination.

Some embodiments include a method for producing a detection layer, in particular for X-ray radiation, comprising perovskite crystals of the type $ABX_3$ and/or $AB_2X_4$, where A is at least one monovalent, divalent or trivalent element from the fourth or a higher period in the periodic table and/or mixtures thereof, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, amidinium ions, guanidinium ions, isothiuronium ions, formamidinium ions as well as primary, secondary, tertiary and quaternized organic ammonium ions, some with 1 to 10 carbon atoms; and X is selected from among the anions of halides and pseudohalides, e.g. the anions chloride, bromide and iodide as well as mixtures thereof, on a substrate, wherein the detection layer is produced by means of a sintering process, comprising:

a) provision of a powder comprising perovskite crystals of the type $ABX_3$ and/or $AB_2X_4$;
b) application of the powder to the substrate;
c) application of pressure and optionally temperature for compaction of the powder.

In the method for producing the detection layer, the material loss can be reduced as compared with methods such as spraying or spinning-on. It is also possible to vary the density of the compacted or sintered layer by means of pressure. This is an important parameter, in particular, where X-ray absorbing layers are concerned. It is possible, with this method, to achieve much greater densities as compared with spraying, spinning-on or blade coating, which has a positive effect on the layer thickness required. The thinner the layer, the lower is the voltage that must be applied to achieve a particular electrical field strength. Thicker layers also have, for example, a greater absorption, in particular X-ray absorption, and improved electrical conductivity.

In some embodiments, the powder comprising perovskite crystals is applied, as a powder, e.g. as a dry powder, onto the respective base/substrate to be coated and is subsequently compacted with the application of pressure, for example, unidirectionally, e.g. with a stamp, a roller, etc., or isostatically, for example, by means of a liquid (e.g. oil) placed under pressure, at a particular sintering temperature, for example, also at a temperature of 20-25° C., and a sintering time or compaction time. Herein, the particles of the starting material become compacted and the pore spaces are filled. Embodiments may include both or either solid phase sintering, e.g. material compaction without melting the powder comprising perovskite crystals of the type $ABX_3$ and/or $AB_2X_4$, as well as liquid phase sintering, e.g. material compaction by means of locally delimited, melting-on of the powder (e.g. directly at the contact surface between the sintering stamp and the crystallite surface). Through the compaction of the molecules by means of pressure and possibly temperature, the intermediate spaces are minimized and compacted such that on application of an electric voltage, electrical charge transport between the individual crystallites or within the coalesced crystallites is possible. In this way, homogeneous monocrystalline or polycrystalline material layers of high (and also low) layer thickness are realizable without complex vacuum process technology at a high throughput and without health risks from possible solvents.

The application of pressure is not particularly restricted and can be achieved by means of suitable devices. In some embodiments, the pressure is exerted by the use of a stamp or a roller which are preferably coated with an anti-adhesion coating, for example, Teflon®. By means of the covering with an anti-adhesion coating, for example, PTFE (polytetrafluoroethylene) or similar materials belonging to the group of polyhalogen olefins (e.g. Teflon®), in particular, very homogeneous surfaces of the layer can be achieved. The use of stamps and/or rollers can also be implemented easily through process engineering. The material of the stamp or the roller is not particularly restricted and can comprise, for example, aluminum, steel, PVC or PTFE (Teflon®). According to particular embodiments, the pressure is applied isostatically by means of a liquid placed under pressure (e.g. oil), which can result in simpler processing.

The pressure that is applied is not particularly restricted, provided a sufficient compaction or sintering is brought about. In some embodiments, a pressure of from 0.1 to 10,000 MPa, e.g. 0.5 to 500 MPa or from 1 to 200 MPa is applied. The sintering time is also not particularly restricted and, according to particular embodiments, is 0.1 s to 60 min, e.g. 1 s to 30 min or 5 to 15 min. With an excessively long sintering time or compaction time, no better results are achieved and a worsening of the material properties can come about, whereas excessively short sintering times or compaction times cannot achieve sufficient compaction/sintering of the layer.

In some embodiments, the substrate can be heated in step c) before or during the application of the pressure for compaction of the powder, for example, to a temperature of 30 to 300° C., e.g. 50 to 200° C. By this means, the sintering process or the compaction can be improved.

The layers produced according to the invention can be verified and characterized based upon the morphology and the surface structure of the sintered or compacted layer (possibly regions melted on individually or over the whole surface). Possibly, indirect conclusions can also be drawn regarding a sintering process, for example, due to the lack of solvent traces, additives and dispersants. The following come into question as investigation methods: optical microscopy, scanning electron microscopy, atomic force microscopy, secondary ion mass spectrometry, gas chromatography, cyclovoltammetry, etc.

In some methods for producing a detection layer, the substrate is not particularly restricted and can comprise all substrates which are normally used in detectors. Thus, it can comprise, for example, glass, indium tin oxide (ITO), aluminum zinc oxide, doped zinc oxide, silicon, etc. In some embodiments, the substrate can have a first electrical contact such as a metal, for example, Cu or Al, ITO, aluminum zinc oxide, doped zinc oxides, etc., and optionally a first intermediate layer as is present, for example, in detectors, for example X-ray detectors.

Alternatively, the layer can be applied onto a temporary substrate (e.g. glass or polymer film) and subsequently lifted therefrom to be further processed as a self-supporting layer. For example, the self-supporting layer can have a metal film applied to the underside and the upper side and then baked or welded in.

In some embodiments, additional photoactive material is added to the coated scintillator particles before the application of pressure or the sintering in order to be able better to fill the pore spaces between the coated scintillator particles.

In some embodiments, the perovskite crystals of the type $ABX_3$ and/or $AB_2X_4$ are provided as a powder, wherein, according to the invention, the powder is not further restricted. In some embodiments, the powder is provided as a dry powder, but a little solvent can also be added to it according to particular embodiments, for example, with less than 10 wt-% or less than 5 wt-% related to the mass of the powder. If a little solvent is added to the powder, it can become sticky, through which its processing, for example, on application to the substrate can be simplified and also thereby possibly less heating of the substrate may be necessary.

In some embodiments, the powder comprising perovskite crystals of the type $ABX_3$ and/or $AB_2X_4$ comprises powder granules with a diameter of 0.01 to 200 μm, e.g. 0.5 to 100 μm, or 1 to 10 μm. In the case of excessively large powder nuclei, compaction may be more difficult, whereas with powder granules that are too small, the processing may be more difficult. Improved results may be achieved with powder granules having a diameter from 1 to 10 μm. The diameter can be determined, for example, with a sieve analysis and corresponding sieves with holes of 1 and 10 μm can be used.

Following the production of the layer in step b) and/or c), optionally a second intermediate layer in step d) and then optionally a second electrical contact (metal such as Al, Cu or ITO, aluminum zinc oxide, doped tin oxides, etc.) can be applied in step e) and these can then also be sintered or compacted. Alternatively, a second intermediate layer and then a second electrical contact can be applied by other method steps such as vapor deposition, spraying, etc. The second electrical contact can, for example, also be applied as a solid layer by gluing. In addition, the second electrical contact can also serve as a new sublayer/new substrate on which again a new layer can be applied with the inventive method. Thus, multi-layered structures may be constructed. A layer comprising the perovskite crystals of the type $ABX_3$ and/or $AB_2X_4$ can also be applied to a layer comprising other powders comprising perovskite crystals of the type $ABX_3$ and/or $AB_2X_4$, so that here also multiple layers can arise which can be sintered separately from one another or also together.

In some embodiments, the layer comprising perovskite crystals of the type $ABX_3$ and/or $AB_2X_4$ can also be applied to a substrate which comprises no electrode material, for example glass, and electrical contacts can then be applied laterally relative to the powder in step b) or relative to the compacted powder in step c), that is, for example, also onto the substrate alongside the layer.

To localize the layer more precisely on the substrate, the application of the powder can be delimited locally, for example, using a frame, e.g. using a frame which is coated at least on the inside with an anti-adhesion coating, for example PTFE. The form of the frame is herein not particularly restricted and can be round/annular, oval, square, rectangular or some other shape. The height of the frame is also not further restricted, but may have a height such as the thickness of the layer which is to be produced or a greater height. Thus, the layer can have a thickness of at least 10 µm, at least 20 µm, or at least 100 µm. In the upward direction, the thickness of the layer is dependent on the intended purpose, but it can also be multiple 100 µm (for example, X-ray detectors), or more. The material of the frame is not particularly restricted and can comprise, for example, aluminum, steel, PVC or PTFE (Teflon®).

The sintering or compaction can take place, for example, by means of stamping or rolling, wherein the substrate can be applied to a hot plate and thereupon a lower electrode, e.g. ITO, Au, Cr, Cu, Ag, Pt and thereupon the layer comprising perovskite crystals of the type $ABX_3$ and/or $AB_2X_4$. The pressure can be applied, for example, by means of a pressing mold which fits into a filling ring/frame, wherein the pressing mold can optionally be heated. In the case of rolling with a roller which is also optionally heatable, the speed, temperature and pressure are the most important parameters. Before the rolling, the powder comprising perovskite crystals of the type $ABX_3$ and/or $AB_2X_4$ can be homogeneously coated dry, for example, by means of a spreading blade, onto the substrate in a correspondingly greater thickness. In the case of stamping, the temperature, pressure and time are the decisive parameters.

Through the pressing, the individual particles touch so that continuous current paths can be formed in the pressed layer, on which the charge carriers generated during the absorption can flow to the contacts.

Following the sintering, an aluminum cathode (layer thickness ca. 200 nm) can be vapor deposited onto the sintered layer by means of physical gas phase deposition. In some embodiments, as early as during the sintering process, to introduce a piece of stamped out aluminum foil as a top contact/upper electrode.

Two different powders comprising perovskite crystals of the type $ABX_3$ and/or $AB_2X_4$ can also be layered over one another and pressed together. In some embodiments, the powder can also comprise scintillators. These can herein be distributed, for example, homogeneously in the powder.

In some embodiments, the scintillators in the powder comprise scintillator particles which are surrounded by a shell of perovskite crystals, as described above. The scintillator particles can have a diameter of from 0.01 to 50 µm, 0.5 to 20 µm, or from 1 to 10 µm. In addition, the shell of perovskite crystals can have a thickness from 15 to 1500 nm, 50 to 1000 nm, 100 to 1000 nm, or 150 to 600 nm.

In some embodiments, coated scintillator particles are covered with a shell of perovskite crystals of the type $ABX_3$ and/or $AB_2X_4$, where A is at least one monovalent, divalent or trivalent element from the fourth or a higher period in the periodic table and/or mixtures thereof, e.g. Sn, Ba, Pb, Bi; B represents a monovalent cation, the volumetric parameter of which is sufficient, with the respective element A, for perovskite lattice formation, e.g. monovalent amino group-containing, positively charged carbon compounds, such as amidinium ions, guanidinium ions, isothiuronium ions, formamidinium ions as well as primary, secondary, tertiary and quaternized organic ammonium ions, some with 1 to 10 carbon atoms; and X is selected from among the anions of halides and pseudohalides, e.g. the anions chloride, bromide and iodide as well as mixtures thereof. The scintillator particles are not particularly restricted and can herein be those described above.

In some embodiments, the scintillator particle has a diameter of from 0.01 to 50 µm, 0.5 to 20 µm, or from 1 to 10 µm. In some embodiments, the scintillator particles have a diameter of 0.1-30 µm, or 1-10 µm, which is matched to the interaction length of high-energy electrons released by X-ray quanta. For the detection of UV radiation, the fall is less severe, so that smaller particles of up to 10 nm diameter can be used.

In some embodiments, the shell comprising perovskite crystals of the type $ABX_3$ and/or $AB_2X_4$ covers the scintillator particle in the coated scintillator particle to at least 80%, 90%, or to at least 95% of its total outer surface. In some embodiments, the scintillator particle is completely covered, that is to 100%, so that the coated scintillator particle is provided with the covering on all sides.

In some embodiments, the shell comprising perovskite crystals of the type $ABX_3$ and/or $AB_2X_4$ has a thickness from 15 to 1500 nm, 50 to 1000 nm, 100 to 1000 nm, or 150 to 600 nm.

In some embodiments, the thickness of the shell/covering is not more than 2.5 times the penetration depth of the emitted radiation of the scintillator particle, so that two directly adjacent scintillator particles have a spacing from one another of not more than five times the penetration depth of the emitted radiation of the scintillator particles. The penetration depth can be derived from the Lambert-Beer law: $I = I\_0 * \exp(-\alpha * d)$
I=transmitted intensity
I_0=initiated intensity
alpha=absorption coefficient
d=layer thickness/penetrated depth of the medium The penetration depth delta is defined as the layer thickness at which the intensity of the electromagnetic radiation has fallen to a 1/e-th part of the starting value and thus is thus the reciprocal value of the wavelength-dependent absorption coefficient.

$$delta=1/alpha$$

For a good functional capability of a detector with the coated scintillator particles, the overall intermediate space between two particles which results, for example, due to the covering of the scintillator particles, should be excited by means of emitted photons. This is ensured, according to the invention, when for example the intensity has fallen to 10%. In the selected example, this would be the case at 300 nm, so that here in the case of two particles, they can even lie 600 nm apart, which represents approximately five times the penetration depth and corresponds to a covering of the inventively coated scintillator particles with a thickness of 300 nm. At five times the penetration depth, therefore, a good absorption of the emitted light of the scintillator particles is ensured.

In some embodiments, the respective spacing between two scintillator particles corresponds to less than three times the penetration depth of the emitted radiation of the scintillator particle and thus a covering of the inventively coated scintillator particles with a thickness of less than 1.5 times the penetration depth of the emitted radiation.

In some embodiments, the spacing between two scintillator particles is a maximum of three times the penetration depth of the emitted radiation of the scintillator particles and according to particularly preferred embodiments, the spacing between two scintillator particles is a maximum of twice the penetration depth of the emitted radiation of the scintillator particles, which corresponds to a covering of the coated scintillator particles with a thickness of a maximum of 1.5 times the penetration depth or a maximum of one times the penetration depth of the emitted radiation of the scintillator particle. In such a case (twice the penetration depth), the charge transport in the perovskite matrix is efficiently improved through the generation of conductive channels between two adjacent scintillator particles under X-ray excitation. In some embodiments, the scintillator particles have a thickness of the covering such that the conductive zones which are generated by the emission of the scintillator particles intersect and so a rapid response behavior can be achieved, for example, with a thickness which corresponds to a maximum of 2.5 times, a maximum of 1.5 times or a maximum of one times the penetration depth of the emitted radiation of the scintillator particle.

In some embodiments, the coating of the scintillator particle with a shell comprises perovskite crystals of the type $ABX_3$ and/or $AB_2X_4$. In some embodiments, a material wherein a scintillator particle is enclosed by a shell comprising perovskite crystals of the type $AB_3$ and/or $AB_2X_4$, as shown schematically in FIG. 3. The shell comprising perovskite crystals of the type $ABX_3$ and/or $AB_2X_4$ is distinguished here, for example in that its absorption property is matched to the emission of the scintillator particle.

The absorption of the crystalline shell layer may be adapted to the emission spectrum of the scintillators. The crystalline covering herein assumes both the absorption of the light emitted by a scintillator and the direct generation of charge carrier pairs and the transport of the separated charge carriers to the corresponding contacts. The coating/covering of scintillators with a crystalline shell of perovskitic lattice structure is a combination of two X-ray active materials, so that X-ray absorption and conversion into an electrical signal by the coated particles is improved as compared with the individual materials (scintillator or pure powder of a perovskitic lattice structure).

In some embodiments, the size of the scintillator particle is so configured that it is adapted to the physical interaction mechanisms. For example, in the field of medical X-ray imaging, X-ray energies of between 10 and 150 keV are typically used. In this energy range, in the X-ray absorption process, the photoelectric effect is dominant, e.g. due to the absorption of an X-ray quantum, a highly energetic electron is knocked out of the atomic orbital and moves in the scintillator crystal. In a plurality of collision processes, this highly energetic electron generates excited states in the scintillator crystal which, by recombination, generate visible light. The penetrating depth of the high energy electron is typically in the range of a few µm, and accordingly, a particle diameter, for example, of 1-10 µm provides a good starting basis. In smaller particles, a portion of the kinetic energy of the photoelectron could be lost, while larger particles are conceivable from optical considerations, but limit the electrical efficiency of later components. In some embodiments, the shell is also adapted in its depth to the absorption length of the photon. The absorption length of green light through the perovskite covering is typically 250 nm-500 nm and a much thicker coating would not improve the absorption properties. The above considerations can be used similarly also for detection of gamma radiation or UV light.

Some embodiments include a method for producing coated scintillator particles wherein at least starting materials for perovskite crystals are brought into solution by means of at least one first solvent, the scintillator particles are added to the solution, subsequently by addition of a further substance such as a second solvent, the coated scintillator particles are precipitated and finally the first solvent and the further substance are removed.

In some embodiments, during the production of the coated scintillator particles, the starting materials for the perovskite crystals are brought into solution by means of at least one first solvent, the scintillator particles are added to the solution, subsequently through the addition of a further substance, for example a second solvent, the coated scintillator particles are precipitated and finally, the at least first solvent and the further substance are removed, for example, by suction, filtration or evaporation of the solvents, etc. Suitable substances for dissolving and precipitating are herein not restricted and can be suitably selected according to the purpose of the use and can also comprise mixtures.

In some embodiments, the scintillator particles are not soluble in the first solvent. In some embodiments, the suspension of the scintillator particles is continuously mixed/stirred during the processing. This can be achieved, for example, in that the suspension is subjected to ultrasonic waves in order to ensure a better distribution of the scintillator particles. However, in some embodiments, the scintillator particles clump together during the precipitation and are obtained as a voluminous mass, since by this means, covered, coated scintillator particles are still obtained. In some embodiments, however, the coated scintillator particles can also be obtained individually, which can be controlled, for example, by means of the concentrations of the reagents used in solution or suspension.

In some embodiments, dispersants, ligands for the scintillator particles, or further additives can also be used, which can then be removed again from the surface of the scintillator particles by the use of ultrasound before the precipitation. In some embodiments, no additives are included, to avoid negatively influencing the perovskite crystal formation.

In some embodiments, the coated scintillator particles are ground to a powder following the removal of the first solvent and the further substance. If so, care is taken that only cohering coated particles are separated and the covering of the coated particles is not attacked, which can be achieved by the selection of a suitable grinding process, for example wet grinding and subsequent drying. Normally, however, it is sufficient simply to grind the particle mass obtained following the separation of the solvent, to a flow-capable homogeneous powder in a mortar.

In some embodiments, the powder consists of powder granules with a diameter of 0.01 to 200 µm, 0.5 to 100 µm, or from 1 to 10 µm. In the case of excessively large powder granules, compaction during the production of inventive detection layers or detectors can be made more difficult, whereas with powder granules that are too small, the method can become too complex. The particle diameter can be determined, for example, based upon optical (high-resolution microscope, dynamic light scattering/DLS), electron microscopic or electrical analysis (e.g. Coulter counter).

In some embodiments, the structure is already formed in the solution. By this means, the material input can be controlled and new possibilities for processing arise from the dry phase. The method is also distinguished by a good processing capability during the production of thick layers in detectors (no drying cracks from escaping solvent), and the associated health and environmental advantages. The production of the coated scintillator particles can take place, for example, on the basis of the process shown in FIGS. 8 to 10, which is already described above in detail.

The quantities to be used for producing coated scintillator particles can be derived, for example, on the basis of the following considerations:

Shell Thickness and the Starting Quantities Needed:

The total volume of an exemplary detection layer is made up of the scintillator nucleus $V_{scintillator}$ and the coating volume of the perovskite crystals $V_{perovskite}$ together. In order to measure out an optimum ratio, the density of the perovskite crystals $\rho_{perovskite}$ and of the scintillator $\rho_{scintillator}$ are needed in order to arrive at the respective weight $W_{perovskite}$ and $W_{scintillator}$. Total volume ($V_{total}$) of the detection layer:

$$V_{total} = V_{perovskite} + V_{scintillator} = \frac{W_{perovskite}}{\rho_{perovskite}} + \frac{W_{scintillator}}{\rho_{scintillator}}$$

To emphasize the distinctive ratios of the volumes and the quantities, these are given in volume-percent and quantity-percent in comparison with the total volume and quantity. The following two formulae illustrate this.

Volume-percentage proportion of the perovskite shell ($V_{perovskite}\%$):

$$V_{perovskite\%} = 100 \cdot \frac{V_{perovskite}}{V_{total}}$$

Quantity-percentage proportion of the perovskite shell ($W_{perovskite}\%$):

$$W_{perovskite\%} = 100 \cdot \frac{W_{perovskite}}{W_{perovskite} + W_{scintillator}}$$

The shell volume depends on the desired absorption of the perovskite crystals. The absorption can be adjusted by means of the layer thickness $r_{perovskite}$ of the shell volume and thus by the absorption length of the emitted light. The shell volume is made up from the total volume with the radii $r_{scintillator}$ and $r_{perovskite}$ minus the inner sphere, the scintillator. It can be calculated as follows: Shell volume sought ($V_{perovskite}$) and thickness ($r_{perovskite}$):

$$V_{perovskite} = \frac{4\pi}{3}((r_{scintillator} + r_{perovskite})^3 - (r_{scintillator})^3)$$

As an example for a scintillator with the radius $r_{scintillator}$=1.8 μm and a coating absorption layer thickness sought of $r_{perovskite}$=0.15 μm, an optimum filling factor $V_{perovskite}\%:V_{scintillator}\%$ of 37%:63% results. With typical densities of $\rho_{perovskite}$=6.1 g/ml and $\rho_{scintillator}$=7.2 g/ml, this results in a weight ratio of $W_{perovskite}:W_{scintillator}$ of approximately 0.9:1.

This quantity ratio is dependent on the diameter of the scintillator and its density. The larger the particle, the less perovskite crystal is needed to meet the aforementioned conditions. The volume ratios are given by the diameter of the scintillators and the penetration depth of the light into the perovskite crystal shell. By means of the thickness, the mass ratio can be calculated according to the above formulae.

On sintering or compaction of the inventively coated scintillator particles, if the individual powder grains touch, current paths form, along which the photo-generated charge carriers are conducted to the contacts and can be detected as a photocurrent (or "X-ray current").

Some embodiments include a detector comprising at least two electrodes and at least one detection layer introduced between the at least two electrodes. The detector can herein be an X-ray detector, a gamma detector, a UV detector, such as a detector for X-ray radiation, such as an X-ray sensitive diode.

The detector may comprise at least one hole-conducting and/or electron-conducting and/or insulating intermediate layer. In some embodiments, the detector, for example, an X-ray detector, a gamma detector or a UV detector, comprises the inventively coated scintillator particles.

In some embodiments, the detector comprises a substrate with a first electrical contact and optionally at least one first intermediate layer, a layer comprising the perovskite crystals of the type $ABX_3$ and/or $AB_2X_4$, for example, also the coated scintillator particles, optionally at least one second intermediate layer and a second electrical contact.

In the method for producing the detector, the substrate is not particularly restricted and can comprise all substrates which are normally used in detectors such as X-ray detectors, gamma detectors or UV detectors. Thus, it can comprise, for example, glass, indium tin oxide (ITO), aluminum zinc oxide, doped zinc oxide, silicon, etc. In some embodiments, the substrate can have a first electrical contact such as a metal, for example, Cu, Ag, Pd, Pt, Cr, Au or Al, ITO, aluminum zinc oxide, doped zinc oxides, etc., and optionally a first intermediate layer as are present, for example, in electro-organic components. The material of the electrodes and/or of the substrate is herein oriented to the use as a detector, for example, X-ray detector, gamma detector or UV detector, wherein different materials are used for the detection of these different radiation types, since for example, in particular embodiments, they are to be transparent to the radiation. Thus, for example, Al is not suitable for UV.

In some embodiments, the material of the electrodes and/or of the substrate reflects the light emitted by the perovskite crystals and/or if relevant, the scintillator particles. By means of the reflective effect of the contacts on the emitted radiation, emitted light does not escape from the active zone. In some embodiments, the first electrical contact and/or the second electrical contact and/or the substrate therefore comprises or consists of a material which reflects the emitted radiation of the perovskite crystals and/or, if relevant, the scintillator particles. Herein, exemplary metals such as Au, Ag, Pd, Pt, Al, Cr or Cu should be mentioned, although a large number of further materials are known, so that the materials of the electrical contacts are not further restricted, so that they reflect the emitted radiation of the perovskite crystals and/or if relevant, the scintillator particles. By means of the corresponding embodiment, the detected signal of the detector can be further improved.

In some embodiments, the inventive detector can contain intermediate layers/interlayers which improve the transition between the active layer and the contact layers and thus improve the contacting of the sample. These interlayers are typically hole-conducting, organic semiconductors or electron-conducting organic semiconductors. As hole-conductor, for example, PEDOT:PSS, P3HT, MDMO-PPV, MEH-PPV, TFB can be used, whereas as electron conductor PCBM can be used. The intermediate layers also have the function of reducing the injection of charge carriers from the electrodes into the sintered layer and thus of enabling a low leakage current (dark current) in the reverse direction. For example, inorganic interlayers can also be used, for example, ZnO or TiO. As interlayers, very thin layers (a few nanometers) of insulating materials (e.g. $Al_2O_3$, $SiO_2$, $Si_3Ni_4$) can also be used.

Exemplary schematic embodiments of the layer structure in detectors are shown in FIGS. 7 to 10.

In the layer structure shown in FIG. 11, a perovskite crystal layer 41 with monocrystalline or polycrystalline perovskite following the sintering is shown on a substrate 42 between a lower electrode 43 and an upper electrode 44. In the layer structure shown in FIG. 12, in place of the perovskite crystal layer 41 in FIG. 11, a detection layer 45 comprising covered scintillator particles is provided. In FIG. 13, in comparison with FIG. 11, in place of the perovskite crystal layer 41, a layer with a mixture of scintillator particles 47 and perovskite crystal particles 46 is shown.

In all three layer structures of FIGS. 11 to 13, below and/or above the detection layer, intermediate layers/interlayers can also be provided, as shown by way of example in the layer structure in FIG. 14. This has, in comparison with the layer structure in FIG. 11, an intermediate layer 48 which can be, for example, a hole blocker such as PCBM, and an intermediate layer 49 which can be an electron blocker such as P3HT or PEDOT or PEDOT:PSS.

In addition to, or instead of, these intermediate layers, insulating layers can also be provided.

In some embodiments, the coated scintillator particles are used for the detection of high-energy radiation, in particular UV radiation, gamma radiation and/or X-ray radiation.

The above embodiments, configurations and developments can be combined with one another as desired, wherever useful. Further possible configurations, developments and implementations of the invention also include not explicitly mentioned combinations of features of the invention described above or in the following in relation to the exemplary embodiments. In particular, a person skilled in the art would also draw upon individual aspects as improvements or enhancements of the respective basic form of the present invention. The exemplary embodiments described herein, however, do not restrict it.

Details relating to the synthesis of exemplary perovskite crystals and the formation of a detection layer according to a first exemplary embodiment are given below. According to the example, all the materials and solvents are prepared, cleaned and oxygen-free, in a glove box or under adequate conditions and also all operations as far as the ready-made ready-to-use material mixture are carried out under such conditions.

Through the addition of a polar solvent, e.g. methanol, in a round-bottomed flask, the starting materials lead-II-halide and a suitable ammonium halide, for example, methylammonium iodide present in substantially the same stoichiometric ratio are partially dissolved at a room temperature of 20 to 22° C. A suspension-like mixture arises simultaneously with the formation of deeply-colored (mostly black) perovskite crystal particles. The formation of the perovskite crystals is completed by means of ultrasonic treatment. By this means, an almost constant particle size of the resultant powder is produced. To crystallize residues of the material still in solution, a second non-polar solvent is now added, e.g. diethyl ether, which leads under ultrasonic conditions to the complete crystallization of the remaining starting materials contained in the solution as black monocrystalline or polycrystalline particles.

Through the addition of the second solvent, a very homogeneous suspension produced by means of sonography is obtained, which rapidly precipitates and is very well suited to vacuum filtration. An aftertreatment of the dried filtrate with a mortar or a vibrating ball mill for delimiting the particle size distribution is not necessary since the powder produced is sufficiently homogeneous. The yield is almost quantitative, at >99%. The powder can be applied, following a possible commutation, onto a substrate such as glass and pressed, by means of a roller, to a detection layer on which electrodes can then be placed.

FIG. 15 shows the measurement of the relative absorption of a correspondingly produced perovskite layer with $CH_3NH_3PbI_3$ in comparison with an organic absorption layer (P3HT:PCBM:GOS). The measurement of the relative absorption of the perovskite layer (shown in the graph with circular measurement points) and, for comparison, an organic absorption layer comprising P3HT:PCBM:GOS in the weight ratio of 1:1:8 (shown in the graph at bottom with squares as the measurement points) took place at different acceleration voltages of 40-120 kV. The relative absorption was therein calculated for the different accelerating voltages, in each case for a layer thickness of approximately 200 μm. During the measurement, the entire braking radiation spectrum including the characteristic radiation of a tungsten anode was used. Firstly, the dose was measured at the sample site without a sample, using a dose measuring device. Subsequently, the dose behind a sample consisting of 1 mm glass (which was used with the following samples as the substrate) and 0.1 mm glass (which serves as the encapsulation of the perovskite layer) was measured. Finally, the dose behind the actual sample including the substrate and the encapsulation was measured. The relative absorption was then calculated from the dose absorption in the sample minus the absorption in the substrate and the encapsulation divided by the irradiated dose.

Shown in FIG. 15 is the tube voltage U in kVolt plotted against the relative absorption $A_r$ in %. Absorption coefficients for perovskite of 66.5 $cm^{-1}$ and for the comparative measurement with P3HT:PCBM:GOS of 32.2 $cm^{-1}$ were found.

In a second exemplary embodiment, production of a homogeneous powder consisting of scintillator particles surrounded by a crystalline perovskite layer took place for the layer formation of an X-ray absorber. The fundamental procedures for preparation and production are similar to the first exemplary embodiment wherein, in addition to the starting materials which form the perovskite lattice, scintillator particles, for example $Gd_2O_2S$:Tb are also added to the round-bottomed flask, for example, in the desired mass ratio of 1:1 (relative to the quantity of the resulting perovskite crystals).

The subsequent procedure is as for the production in the first embodiment. The formation of the coated particles begins immediately on addition of the solvent so that, for example, a gray-black particle mixture of homogeneous composition forms, the "gray value" of which depends on the proportion of the scintillator.

In some embodiments, a detection layer includes a material crystallized in a perovskite lattice layer and shows, apart from the absorption of visible light and X-ray radiation, also good electrical conductivity of the charge carrier pairs produced and a high level of mobility up to 50 $cm^2$/Vs. Given a coating of a scintillator particle with a thin crystalline shell made of a perovskite lattice-forming material which absorbs the incident light generated by a scintillator and thereby conducts charge carriers generated to the contacts, a further improvement of the detection in a detection layer can be achieved. At the same time as the scintillator, the crystalline coating also converts only X-ray radiation into charge carriers. The combination of two X-ray sensitive materials hereby increases the absorption and enables the detection over a greater wavelength range as compared with the two individual layers of scintillator or pure perovskite powder. Thus, over a greater energy range, more photons of the X-ray radiation can be detected. Here also, as soon as during a synthesis performed in advance and not only during the drying phase, the structure forms on the substrate, as is the case in the conventionally typical method for producing perovskite layers.

Through a combination of scintillator particles and perovskite crystals, even in the mixture, the absorption and thus the detection is possible over a greater wavelength range as compared with the individual materials, which improves the efficiency of the detection. The photons generated on use of a scintillator are absorbed in the adjoining perovskite lattice material and converted into charge carriers. This increase in the charge carriers has positive effects in the perovskite lattice material since therefore the conductivity (and the mobility) is increased and the response times of the detectors can be reduced so that the detectors become faster.

The manufacturing method for the detection layers in contrast to the solution-based process techniques arises from the material powder that can be synthesized in any desired quantities, firstly as a pure crystal powder and, secondly, as a shell round the scintillator. Herein, the synthesis takes place effectively loss-free and the powders can be stored for as long as desired. By this means, the material input can be controlled better and new possibilities for processing result. The use of an ultrasonic device for dispersing enables, as compared with manual stirring, a more homogeneous, finer monocrystalline or polycrystalline powder. The crystallinity of the powder can be tested optically after production since, for example, in the case of $CH_3NH_3PbI_3$, crystalline powder with a perovskite lattice structure is black, whereas amorphous powder appears yellowish.

The powders produced with this method enable a relatively simple processing, particularly of relatively thick layers, since no drying cracks arise due to emerging solvent. In addition, health and environmental advantages result therefrom. Through the processing by means of stamping or rolling, the material loss is reduced to a minimum as compared with methods such as spraying or spinning-on. By means of the pressure of the stamp or the roller, the density of the layer produced can be varied, which is advantageous primarily for X-ray absorbing layers. In comparison with spraying, spinning-on or blade coating, the density can be increased, so that the layer thickness necessary for the same absorption of X-ray radiation is thinner. This has the advantage that lower voltages are also sufficient to generate the same electrical field strength in the component.

What is claimed is:

1. A detector comprising:
   at least two electrodes and,
   at least one detection layer between the at least two electrodes, the at least one detection layer comprising:
   perovskite crystals of the type $ABX_3$ and/or $AB_2X_4$;
   where A comprises at least one monovalent, divalent or trivalent element from the fourth or a higher period in the periodic table and/or mixtures thereof;
   B comprises a monovalent cation, the volumetric parameter of which is sufficient, with the respective element A, for perovskite lattice formation; and
   X is selected from the group consisting of anions of halides and pseudohalides;
   wherein the at least one detection layer has a thickness of at least 10 µm; and
   wherein the perovskite crystals have a crystal size of 1-10 µm.

2. The detector as claimed in claim 1, further comprising scintillators.

3. The detector as claimed in claim 2, wherein the scintillators comprise scintillator particles surrounded by a shell comprising the perovskite crystals.

4. The detector as claimed in claim 3, wherein the scintillator particles have a diameter of from 0.01 to 50 µm.

5. The detector as claimed in claim 1, further comprising at least one hole-conducting or electron-conducting or insulating intermediate layer.

* * * * *